(12) United States Patent
Gootee, III et al.

(10) Patent No.: US 10,346,560 B2
(45) Date of Patent: Jul. 9, 2019

(54) ELECTRONIC BLUEPRINT SYSTEM AND METHOD

(71) Applicant: PlanGrid, Inc., San Rafael, CA (US)

(72) Inventors: Ralph L. Gootee, III, Berkeley, CA (US); Cory R. Lorenz, San Francisco, CA (US); Kenny W. Stone, Berkeley, CA (US)

(73) Assignee: PlanGrid, Inc., San Rafael, CA (US)

( * ) Notice: Subject to any disclaimer, the term of this patent is extended or adjusted under 35 U.S.C. 154(b) by 0 days.

(21) Appl. No.: 14/176,662

(22) Filed: Feb. 10, 2014

(65) Prior Publication Data

US 2014/0229426 A1   Aug. 14, 2014

Related U.S. Application Data

(60) Provisional application No. 61/850,517, filed on Feb. 14, 2013.

(51) Int. Cl.
*G06F 17/50* (2006.01)
*G06F 17/24* (2006.01)
*G06F 17/21* (2006.01)

(52) U.S. Cl.
CPC ........ *G06F 17/5004* (2013.01); *G06F 17/218* (2013.01); *G06F 17/24* (2013.01); *G06F 17/241* (2013.01); *G06F 2217/74* (2013.01)

(58) Field of Classification Search
CPC .......................... G06F 17/5004; G06F 2217/74
USPC ........................................................ 707/608
See application file for complete search history.

(56) References Cited

U.S. PATENT DOCUMENTS

| | | | | |
|---|---|---|---|---|
| 8,036,493 B1* | 10/2011 | Neustel | ............ | G06K 9/00442 345/658 |
| 8,943,197 B1* | 1/2015 | Taylor | ................. | G06F 17/2247 709/224 |
| 2002/0049847 A1* | 4/2002 | McArdle | ................ | G06Q 10/10 709/227 |
| 2004/0088332 A1* | 5/2004 | Lee | ........................ | G06Q 10/10 |
| 2006/0041502 A1* | 2/2006 | Blair | ..................... | G06F 17/227 705/37 |
| 2009/0324096 A1* | 12/2009 | Megawa | .......... | G06F 17/30011 382/206 |
| 2010/0088239 A1* | 4/2010 | Blair | ..................... | G06F 17/227 705/80 |
| 2012/0075648 A1* | 3/2012 | Keys | .................. | G06K 9/00979 358/1.11 |

(Continued)

FOREIGN PATENT DOCUMENTS

JP   2006-352096   7/2008
WO   WO 2013091556 A1 *   6/2013   ......... G06F 9/45529

*Primary Examiner* — Mark D Featherstone
*Assistant Examiner* — Diedra McQuitery
(74) *Attorney, Agent, or Firm* — Gates & Cooper LLP

(57) ABSTRACT

A system and method for efficient management and viewing of electronic data and documents, such as electronic blueprint sheets. The system and method may include processing the electronic blueprint sheets by a computing device. The system and method may include querying by the computing device and processing modules to determine their availability. Each processing module may cause further processing of each page. The system and method may include distributing of the blueprint file to available processing modules based on the availability of the processing modules for processing.

10 Claims, 21 Drawing Sheets

(56) References Cited

U.S. PATENT DOCUMENTS

| | | |
|---|---|---|
| 2012/0323919 A1 | 12/2012 | Alba et al. |
| 2012/0324341 A1 | 12/2012 | Dejean |
| 2013/0024475 A1 | 1/2013 | Sappey et al. |
| 2013/0346506 A1* | 12/2013 | Zimmerman .......... G06Q 10/06 709/205 |
| 2014/0101310 A1* | 4/2014 | Savage .................. H04L 43/00 709/224 |

* cited by examiner

| | | | |
|---|---|---|---|
| (ST) | Stamp | OPEN | issue no. 95 | sheet S1 |
| (CD) | Ceiling Drywall | OPEN | issue no. 94 | sheet A2.31 |
| (DC) | Door Closer | OPEN | issue no. 93 | sheet S6.15 |
| (CD) | Ceiling Drywall | IN REVIEW | issue no. 92 | sheet S6.15/200 |
| (DA) | Door Adjustment Needed | OPEN | issue no. 91 | sheet 0 Sheet Name |

*FIG. 16*

| Y PROGRAM | CADD FILENAME BSP-B105-P | |
|---|---|---|
| INE NORTH | SIZE: D | SCALE 1"=20'H; 1"=10'V |
| S | CONTRACT NO. 15PE-110 | REV. P |
| 00 T AVENUE | CONTRACT SHEET NO. B105 | PAGE NO. 0612 |

*FIG. 18*

| Y PROGR[A]M | CADD FILENAME BSP-B105-P | |
|---|---|---|
| INE NO[R]TH | SIZE: D | SCALE 1"=20'H; 1"=10'V |
| S | CONTRACT NO. 15P[E]-110 | REV. [P] |
| 00 T AVENUE | CONTRACT SHEET NO. [B]105 | PAGE NO. 0[6]12 |

*FIG. 19*

ELECTRONIC BLUEPRINT SYSTEM AND METHOD

CROSS-REFERENCE TO RELATED APPLICATIONS

This application claims the benefit of U.S. provisional patent application No. 61/850,517, filed Feb. 14, 2013, which is herein incorporated by reference in its entirety.

TECHNICAL FIELD

This description relates to various systems and methods for managing and viewing electronic data and documents, and, in particular, electronic blueprint sheets.

BACKGROUND

Users of physical blueprint sheets generally carry a set of physical blueprints in the field, and on a job site (e.g., construction site). A single job site generally has multiple sets of the same blueprint sheets that are copies of a Master Set. The copies are used by various users in the field. In the field, users generally make various contextual notes on their own respective sets of physical blueprint sheets. The Master Set of physical blueprints is tediously updated by copying contextual notes from the physical blueprint sheets brought back from the field onto the Master Set. Thus, there remains a need for more efficient management of blueprint sheets and the viewing thereof.

SUMMARY

Briefly, and in general terms, various embodiments are directed to a system and method that provides efficient management and viewing of electronic data and documents, e.g., electronic blueprint sheets that correspond to physical blueprint sheets. In some embodiments, the electronic blueprint sheets may be scans of the physical blueprint sheets.

In some embodiments, a method may include receiving, by at least one computing device, a blueprint file that includes data representative of a blueprint having one or more pages. The method may include processing, by the at least one computing device, the blueprint file. The processing may include determining the number of pages of the blueprint file. The method may include querying, by the at least one computing device, processing modules to determine their availability. Each processing module may cause, in response to execution by the at least one computing device, further processing of each page. The method may include distributing, by the at least one computing device, each page of the blueprint file to available processing modules based on the availability of the processing modules for the further processing of each page such that each page is distributed to a single processing module.

In some embodiments, a method for displaying an electronic blueprint sheet may include accessing, from a memory using a processor, a first image. The first image may be a thumbnail image representative of the electronic blueprint sheet. The method may include accessing, from the memory using the processor, a second image. The second image may include contextual information corresponding to the electronic blueprint sheet. The method may include juxtapositioning the first image and the second image on a display.

In some embodiments, a method for annotating an electronic blueprint on a computing device may include accessing an electronic blueprint sheet. The blueprint sheet may be accessed over a network. The method may include displaying at least a portion of the electronic blueprint sheet on a display of the computing device. The method may include receiving, by an input device of the computing device, a user input from a user. The method may include annotating the electronic blueprint sheet based on the user input resulting in an annotation.

In some embodiments, a method for extracting a unique identifier from an electronic blueprint sheet may include accessing, by a computing device, an electronic blueprint sheet. The electronic blueprint sheet may be a PDF. The method may include determining, by the computing device, whether the PDF is vector-based or image-based. The method may include performing, by the computing device, vector text extraction or optical character recognition text extraction based on the determination of whether the PDF is vector-based or image-based.

In some embodiments, a system may include one or more memories in communication with one or more hardware processors of one or more computing devices. The one or more memories may have instructions stored thereon that, in response to execution by the one or more computing devices, cause the one or more computing devices to perform operations. The operations may include receiving a blueprint file that includes data representative of a blueprint having one or more pages. The operations may include processing the blueprint file. The processing may include determining the number of pages of the blueprint file. The operations may include querying processing modules to determine their availability. Each processing module may cause further processing of each page. The operations may include distributing each page of the blueprint file to available processing modules based on the availability of the processing modules for the further processing such that each page is distributed to a single processing module.

In some embodiments, a system may include one or more memories in communication with one or more hardware processors of one or more computing devices. The one or more memories may have instructions stored thereon that, in response to execution by the one or more computing devices, cause the one or more computing devices to perform operations. The operations may include accessing a first image. The first image may be a thumbnail image representative of the electronic blueprint sheet. The operations may include accessing a second image. The second image may include contextual information corresponding to the electronic blueprint sheet. The operations may include juxtapositioning the first image and the second image on a display.

In some embodiments, a system may include one or more memories in communication with one or more hardware processors of one or more computing devices. The one or more memories may have instructions stored thereon that, in response to execution by the one or more computing devices, cause the one or more computing devices to perform operations. The operations may include accessing an electronic blueprint sheet. The operations may include displaying at least a portion of the electronic blueprint sheet on a display. The operations may include receiving, by an input device, a user input from a user. The operations may include annotating the electronic blueprint sheet based on the user input resulting in an annotation.

In some embodiments, a system may include one or more memories in communication with one or more hardware processors of one or more computing devices. The one or more memories may have instructions stored thereon that, in response to execution by the one or more computing devices, cause the one or more computing devices to perform operations. The operations may include accessing an electronic blueprint sheet. The electronic blueprint sheet may be a PDF. The operations may include determining whether the PDF is vector-based or image-based. The operations may include performing vector text extraction or optical character recognition text extraction based on the determination of whether the PDF is vector-based or image-based.

In some embodiments, a system may include a network. The system may include at least one server for storing uploaded blueprint files connected to the network. The system may include at least one computing device having a display and a user input device. The at least one computing device may be connected to the network. The at least one computing device may be configured to display electronic blueprint sheets corresponding to the uploaded blueprint files on the display, receive user input from the user input device, and annotate displayed electronic blueprint sheets.

In some embodiments, a system for displaying an electronic blueprint sheet may include a non-transitory memory in communication with a processor. The non-transitory memory may have instructions stored thereon that, in response to execution by the processor, cause the processor to perform operations. The operations may include accessing, from a memory using a processor, a first image. The first image may be a thumbnail image representative of the electronic blueprint sheet. The operations may include accessing, from the memory using the processor, a second image. The second image may include contextual information corresponding to the electronic blueprint sheet. The operations may include juxtapositioning the first image and the second image on a display.

In some embodiments, a system for annotating an electronic blueprint on a computing device may include a computing device operable to access an electronic blueprint sheet. The computing device may be operable to display at least a portion of the electronic blueprint sheet on a display of the computing device. The computing device may be operable to receive, by an input device of the computing device, a user input from a user. The computing device may be operable to annotate the electronic blueprint sheet based on the user input resulting in an annotation.

In some embodiments, an article of manufacture including a non-transitory computer readable medium having instructions stored thereon that, in response to execution by a computing device, cause the computing device to perform operations that may include accessing an electronic blueprint sheet. The electronic blueprint sheet may be a PDF. The operations may include determining whether the PDF is vector-based or image-based. The operations may include performing vector text extraction or optical character recognition text extraction based on the determination of whether the PDF is vector-based or image-based.

The foregoing summary does not encompass the claimed invention in its entirety, nor are the embodiments intended to be limiting. Rather, the embodiments are provided as mere examples.

BRIEF DESCRIPTION OF THE DRAWING

FIG. 16 is one example of a viewport showing a portion of a master sheet with five placed stamps.

FIG. 18 is one example of a title block in a blueprint sheet.

FIG. 19 is the title block of FIG. 18 with boxes drawn around characters that may be high ranking for sheet name extraction.

DETAILED DESCRIPTION

Figure 1:
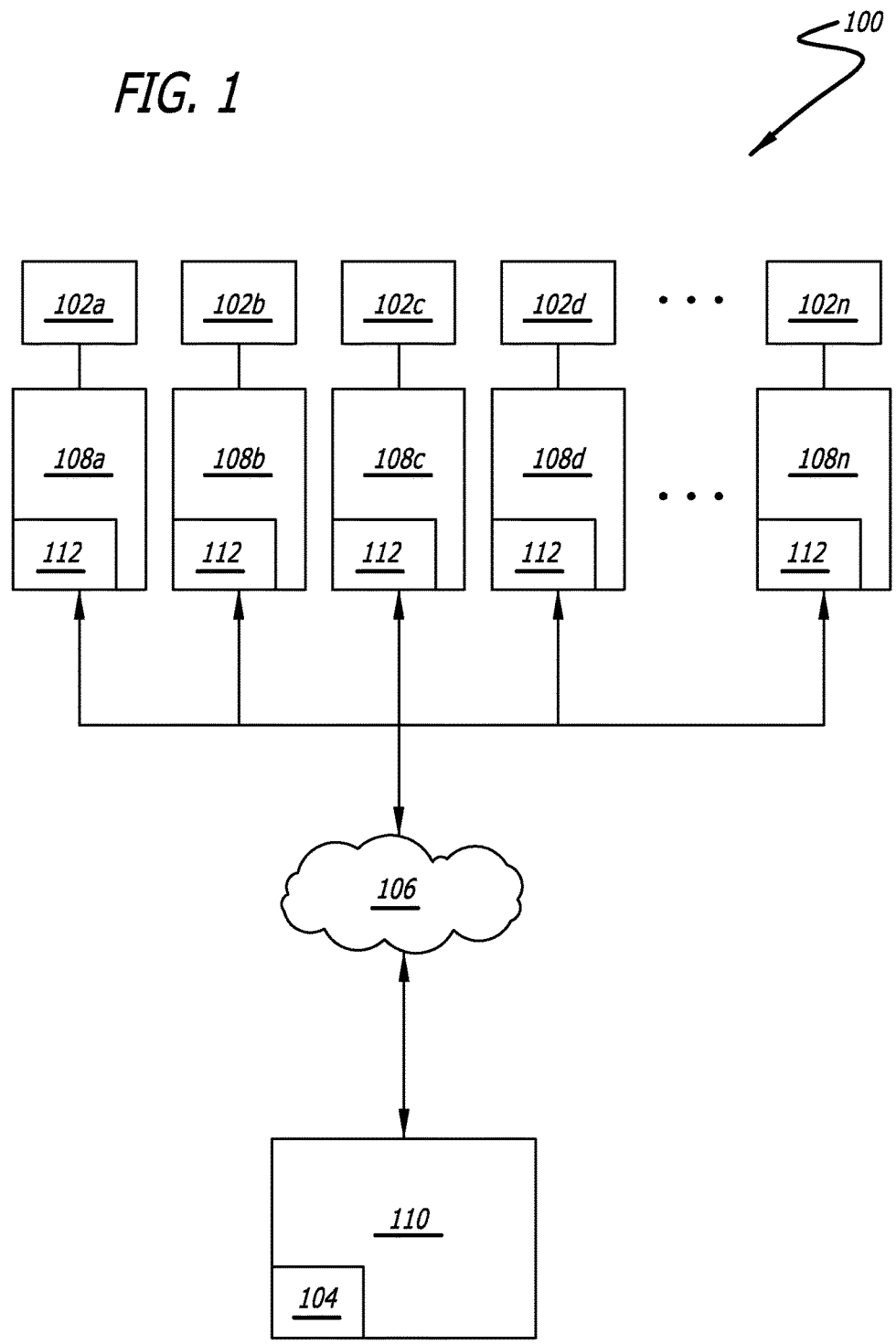
FIG. 1 is a diagram of an electronic blueprint system according to one embodiment.

Referring now to the drawings, wherein like reference numerals denote like or corresponding parts throughout the drawings and, more particularly to FIGS. 1-21, there are shown various embodiments of an electronic data and document management and viewing system and method, and more particularly to an electronic blueprint system 100 and method that enables a user to upload, view, filter, sort, manage, version, annotate, rotate, and otherwise use electronic blueprint sheets. In some embodiments, the electronic blueprint system 100 and method ensures all users that are part of a particular project are using the most recent, synced sheets.

In some embodiments, as used herein, a blueprint sheet or page may refer to one or more of the following non-exclusive examples: any architectural plan, drawing, design, schematic, layout, master plan, sketch, graphical representation, data; any engineering plan, drawing, design, schematic, layout, master plan, sketch, graphical representation, data; any construction plan, drawing, design, schematic, layout, master plan, sketch, graphical representation, data; any building plan, drawing, design, schematic, layout, master plan, sketch, graphical representation, data; any mechanical plan, drawing, design, schematic, layout, master plan, sketch, graphical representation, data; any electrical plan, drawing, design, schematic, layout, master plan, sketch, graphical representation, data (e.g., electrical schematic); any plan, any drawing, any design, any schematic, any layout, any master plan, any sketch, any graphical representation, any map, any data, any combination thereof, or the like.

FIG. 1 is a diagram of an electronic blueprint system 100 according to one embodiment. Various aspects of the electronic blueprint system 100 and methods, functions, steps, features and the like corresponding thereto may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, personal data assistant, tablet computer, laptop computer, desktop computer, other computing device, and the like). For example, each computer system or computing device in the electronic blueprint system 100 or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by the electronic blueprint system 100 or any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an ANDROID® computing device, BLACKBERRY® computing device, APPLE® computing device, WINDOWS® computing device, SAMSUNG® computing device, other computing device, and the like. Execution of the application program on the user's computing device may require that the device transmit and receive data to and from one or more computing devices such as a server or other user's computing device.

One or more embodiments of the electronic blueprint system 100 may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

As described herein, one or more aspects of the electronic blueprint system 100 may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the electronic blueprint system 100 utilizes one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the electronic blueprint system 100.

Referring to the embodiment shown in FIG. 1, at least one user 102 accesses a website 104 associated with the electronic blueprint system 100 over a network 106 (e.g., internet) using a computing device 108. The website 104 may have an IP address and domain name associated with it. The website 104 may be hosted or otherwise operated by at least one computing device such as server 110, which is a computer system within the electronic blueprint system 100. In some embodiments, the computing device 108 may include the user's personal desktop computer, laptop computer, smart phone, tablet computer, PDA, or the like. The computing device 108 has standard computing components such as at least one memory, at least one user input device, at least one display, at least one network interface, and at least one processor. The computing device 108 presents a graphical user interface to the user via the at least one display. The graphical user interface is displayed based on corresponding software instructions being executed by the computing device (e.g., by a processor).

If it is the user's first visit to the website 104, he or she may create an account. In some embodiments, creating an account is unnecessary. Among other things, the user may create a username and a password. This account information is saved on a memory accessible to the server 110. The electronic blueprint system 100 enables a user to create a project and upload at least one electronic blueprint file for the project. In some embodiments, the blueprint file may be a PDF (e.g., an image-based PDF, a vector-based PDF, or a text-based PDF). In other embodiments, the blueprint file may be in a format other than PDF. The blueprint file may include one or more pages. Each page may have a unique identifier. For example, each page of a blueprint file may have a title that uniquely identifies each page. In some embodiments, the title may be a page number, sheet number, contract number, contract sheet number, and the like. Each blueprint page may be of any size and dimension.

In some embodiments, the user 102 may download an application program 112, such as an app from an app store or from the website 104. The application program or website 104 may have corresponding software instructions that are executable by at least one processor associated with at least one computing device in the electronic blueprint system 100. In some embodiments, the user installs the application on his or her computing device 108 to enable the computing device to communicate with the website 104 or a cloud. The application program may similarly enable a user to create a project and upload at least one electronic blueprint file for the project. The graphical user interface enables the user to visually interact with the application program or the website 104 by using one or more input devices such as a mouse, keyboard, or touchscreen.

The electronic blueprint system 100 enables the user to upload one or more files to one or more servers. For example, the website 104 or application 112 may enable a user to browse a file archive (e.g., the user's own files) and select a file that he or she desires to upload to a server. In some embodiments, the server is the website server 110. The user's selected blueprint file(s) for uploading may be transmitted, received, processed, and/or stored for analysis and future access by one or more computer systems in the electronic blueprint system 100. The electronic blueprint system 100 may enable users to email, or otherwise electronically send, any changes or annotations to a file to other users.

Figure 2:
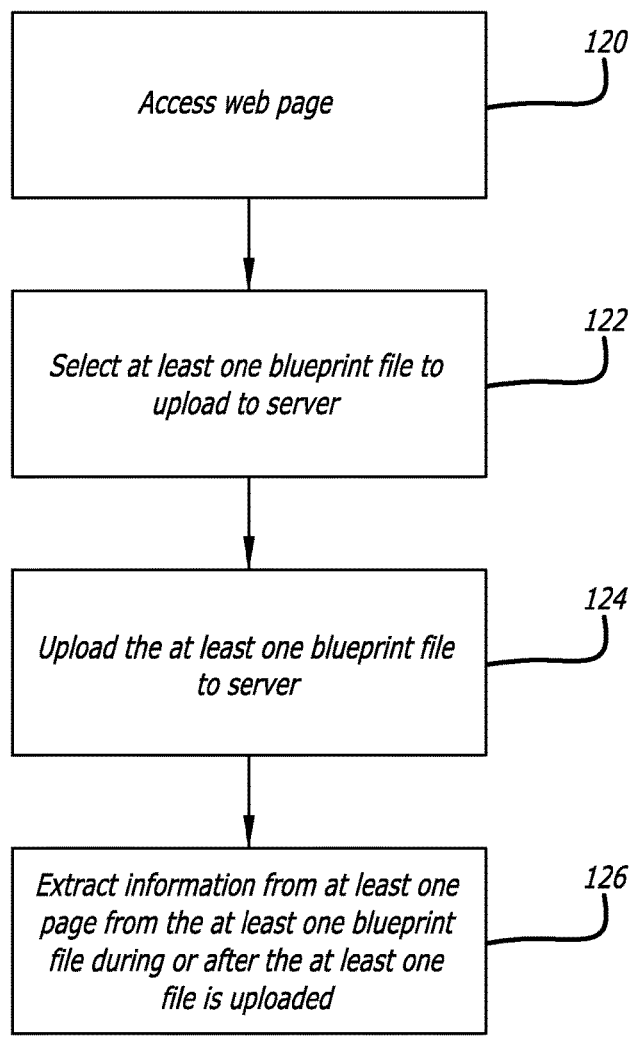
FIG. 2 is a flowchart of a method according to one embodiment of the electronic blueprint system.

Referring now to FIG. 2, a flowchart of a method according to one embodiment of the electronic blueprint system 100 is shown. A web page may be accessed at block 120. At block 122, at least one blueprint file may be selected for upload to a server. At block 124, the selected at least one blueprint file may be uploaded to the server. At block 126, information may be extracted from the at least one blueprint file during or after the at least one file is uploaded.

In some embodiments, upon receiving an uploaded blueprint file, a computing device in the electronic blueprint system 100 conducts a number of processes on the uploaded blueprint files. One or more modules may correspond to each process conducted on the uploaded blueprint files. Each module may have corresponding software instructions stored on a memory that cause, when executed by a processor, the processor to perform or obtain the corresponding method, function, step, feature, or result. In some embodiments, the electronic blueprint system 100 determines the number of pages of the uploaded blueprint file.

Figure 3:
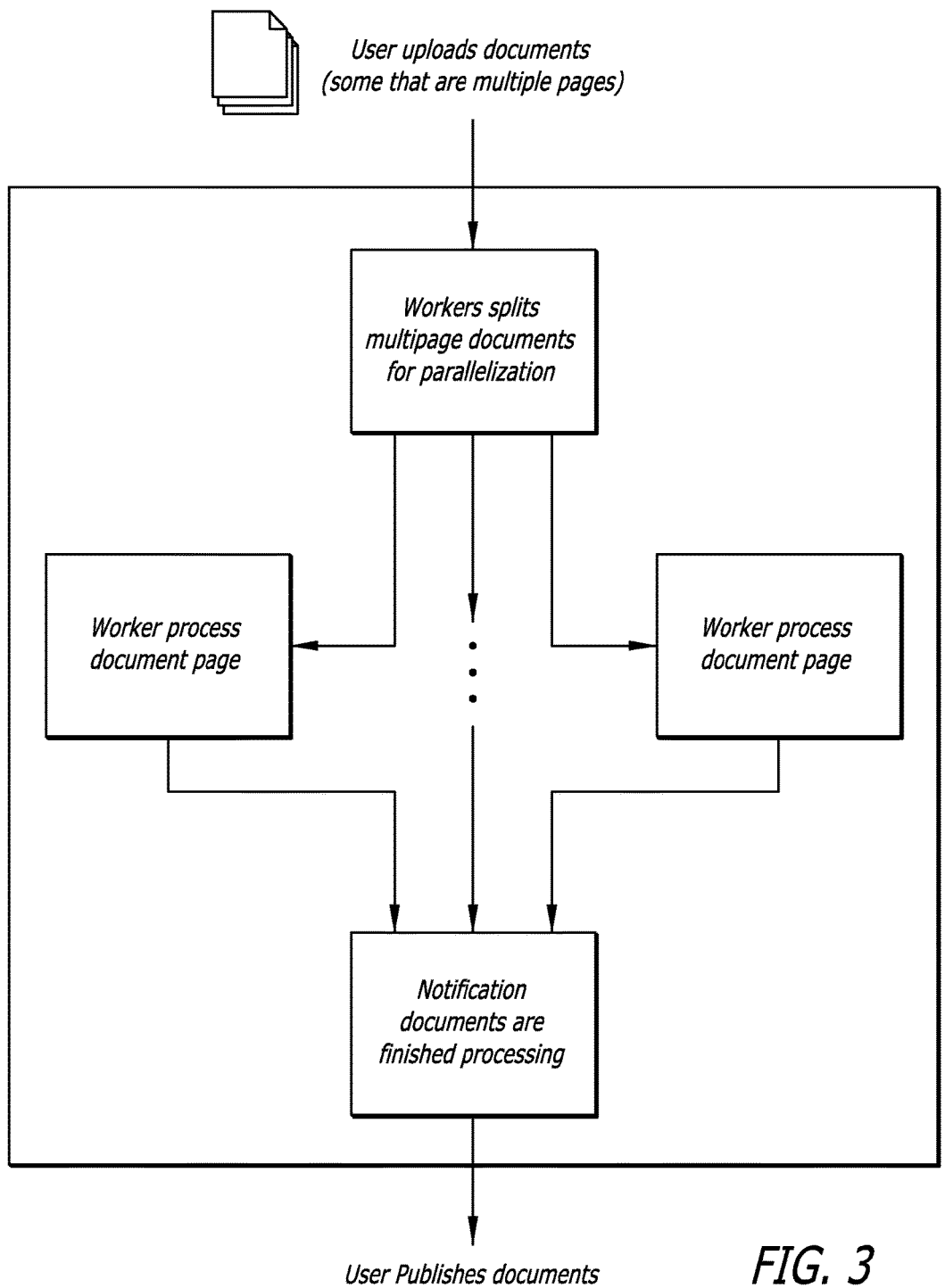
FIG. 3 is a flowchart of a method according to one embodiment of the electronic blueprint system where one or more workers process a file.

With reference to FIG. 3, a flowchart of a method according to one embodiment of the electronic blueprint system 100 is shown where one or more workers processes inputted documents. Each worker may correspond to a different computing device in the electronic blueprint system 100 according to one embodiment. In another embodiment, each worker may correspond to a processing module that causes, in response to execution by a computing device, further processing of each page. The workers may be spread across one or more computing devices (e.g., servers). For example, one-hundred workers may be spread across five servers. In some embodiments, the electronic blueprint system 100 follows a one sheet per file paradigm, meaning that each page of the uploaded blueprint file is further processed by a single worker. For example, a one-hundred page blueprint file may be processed by one-hundred workers whereas a one-thousand page blueprint file may be processed by one-thousand workers. In other embodiments, a one-hundred page blueprint file may be processed by twenty workers (e.g., each worker may process five pages).

Each page of the uploaded blueprint file is further processed by each worker, which may include thumbnailing, tiling, text extraction (e.g., extracting a unique identifier such as a title), metadata extraction, DPI estimation, hyperlink generation, rasterization, auto-orienting the file, cross referencing, and more. Thumbnailing may include taking a large document and making it much smaller in size. Tiling may include splitting each page of the blueprint file into various dimensions (i.e., tiles) and extracting it into a row by column grid. These grid tiles enable a computing device associated with the electronic blueprint system 100 to load the entire image into memory over time, rather than all at once. Otherwise stated, these grid tiles enable a computing device to load only the tiles corresponding to the portion of the blueprint page(s) currently being viewed by a user via a display on the computing device. For example, the tiles loaded may be dependent on a zoom level set by the user. The further the user is zoomed in on a particular blueprint page, fewer tiles need to be loaded therefore saving valuable processing, memory, and bandwidth resources; and also decreasing load times.

Metadata extraction may include extracting information from each page of the blueprint file or the blueprint file as a whole. This information may include a description, data of creation, potential hyperlinks, scale, authorship, and the like.

Physical blueprint sheets generally include cross references that lead a user from a one page to a different page. These cross references are automatically detected during the processing of each page, and a cross hyperlink is automatically generated for each sheet. In some embodiments, the electronic blueprint system 100 determines the presence of cross reference data by analysing the image of each sheet (e.g., performing text extraction near, for example, certain patterns). The cross hyperlink may be selected by the user to navigate to and from the referenced sheets.

Figure 4:
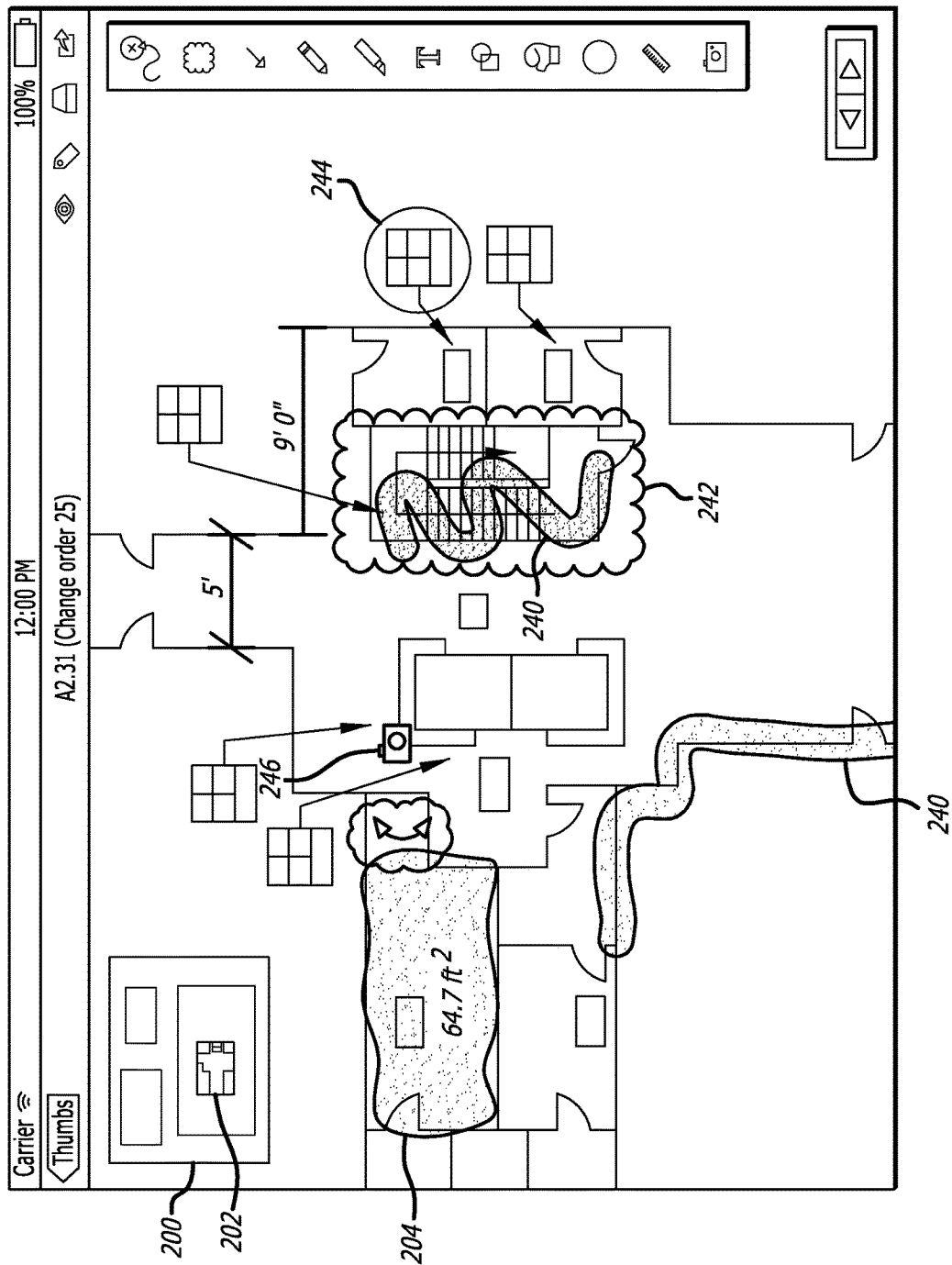
FIG. 4 is one embodiment of a graphical user interface displayed to a user showing a portion of an electronic blueprint sheet in at least one portion of a viewport showing a plurality of cross hyperlinks.

FIG. 4 depicts one example of one embodiment of a graphical user interface displayed to a user showing a portion of an electronic blueprint sheet in at least one portion of a viewport showing a plurality of cross hyperlinks on sheet A2.31 (Change Order 25). In the embodiment shown, the cross hyperlinks are the circles. In some embodiments, the viewport is the display region of a computing device presenting the electronic blueprint sheet, any menus, toolbars, or any combination thereof. In this regard, a single display may include a plurality of viewports that may or may not be rendered as a single frame in some embodiments. In other embodiments, the viewport is the entire real estate of the display that the electronic blueprint system 100 has access to.

If the user selects (e.g., by clicking on, touching the screen, or by other means) the cross hyperlink B5/A9.50, the electronic blueprint system 100 will navigate the user to a sheet having A9.50 as its name. In some embodiments, the electronic blueprint system 100 centers the user's viewport on the corresponding cross reference to B5/A2.31 on sheet B9.50 (since cross hyperlinks refer back to one another between sheets to enable easy navigation to and from) at a predetermined zoom level. In one embodiment, the predetermined zoom level may be "fit to viewport," meaning that the entire sheet A2.31 is seen. In such an embodiment, the zoom is not centered on the cross hyperlink(s). In another embodiment, the predetermined zoom level may be the same zoom level at which the user was viewing the previous sheet (A2.31). In such an embodiment, if the user was viewing sheet A2.31 at 37% zoom, 120% zoom, or 400% zoom; then the electronic blueprint system 100 would display sheet A9.50 with the selected hyperlink centered in the user's viewport using 37% zoom, 120% zoom, or 400% zoom, respectively. In yet another embodiment, the predetermined zoom level is a default zoom level that may or may not be different than the zoom level at which the user was viewing the previous sheet (A2.31). In other embodiments, electronic blueprint system 100 presents sheet A9.50 on the user's viewport with the cross hyperlink to B5/A2.31 at a predetermined position in the user's viewport. In one embodiment, the predetermined position may be the center of the user's viewport. In another embodiment, the predetermined position may be a location on the user's viewport other than center (e.g., always top left, always top right, always bottom left, and the like). In yet another embodiment, the predetermined position may be the same location at which the cross hyperlink B5/A9.50 was positioned on the user's viewport.

The predetermined position and the predetermined zoom level associated with cross hyperlinks may be configured by a user. The configurations may be user-specific, project-specific, sheet-specific, or device-specific. The cross hyperlink embodiments herein enable a user to navigate to and from different, related electronic blueprint sheets. The cross hyperlink embodiments herein further enable a user to navigate to and from different, related electronic blueprint sheets using default settings or user configured settings.

High resolution blueprints generally will be provided in standard sizes like 42"×30." However, users often upload 8.5"×11" documents that are actually high resolution (i.e., high DPI) documents. Without knowing the DPI associated with uploaded documents, the uploaded documents may look blurry when rasterized. PDFs may not have a DPI inherently associated therewith (e.g., vector-based PDFs). Therefore, in some embodiments, the DPI for one or more pages of a PDF may be calculated. In some embodiments, PDFs may contain rasterized images. A PDF may contain metadata relating to the DPI of any images (either vectorized or rasterized) in any PDF container, but this DPI metadata may be unreliable. Therefore, the DPI for one or more pages of a PDF may be calculated.

In some embodiments, the algorithm to calculate the appropriate DPI may be as follows (shown in pseudo code):
1. Let DEFAULT_DPI equal the assumed number of dots per inch needed to extract optimal resolution. In some embodiments, the optimal resolution is approximately 150 dots per inch. Generally, 150 dots per inch is the threshold or around the threshold at which humans do not notice blurring or other artifacts. Therefore, DEFAULT_DPI may equal 150 in some embodiments. In other embodiments, DEFAULT_DPI may equal any number less than 150 or any number greater than 150. For example, DEFAULT_DPI may equal a number between the range of 75 and 600. Of course, this is one example range and the minimum and maximum may be lower or higher in other examples.
2. Let MAX_DPI be some number greater than DEFAULT_DPI with which to raise the resolution to achieve 150 DPI.
3. Let MIN_SIZE be the minimum expected size for a document, which may be measured in inches. In some embodiments, MIN_SIZE may equal 20 inches. In other embodiments, the MIN_SIZE may equal any number less than or greater than 20 inches. For example, MIN_SIZE may equal a number between the range of 5 inches and 50 inches. Of course, this is one example range and the minimum and maximum may be lower or higher in other examples. In other embodiments MIN_SIZE may be measured based on a unit of measurement different than the inch.
4. Get the document size in points, W_Points×H_Points.
5. Convert W_Points×H_Points from points to inches by dividing by 72 resulting in W_Inches×H_Inches. 72 is used in some embodiments because the PostScript or desktop publishing point may be used, which 1 point corresponds to 1/72 inches. Of course, other embodiments may use different point systems, and therefore, a value different than 72.
6. If W_Inches or H_Inches is below the expected value (MIN_SIZE) assume this document needs to be sampled at a higher resolution.
   a. if W_Inches or H_InchesMIN_SIZE then the determined DPIMAX_DPI
   b. Otherwise, the determined DPIDEFAULT_DPI
7. Rasterize file or sheet based on calculated DPI.

The algorithm immediately above may ensure that the document is never bounded by the maximum number of pixels a document is allowed to include. The determined DPI is used in the process from going from a PDF to a rasterized file.

After the user has uploaded a file, and after the file is finished being processed, the user is ready to stage each page or sheet. In other embodiments, this step is optional meaning that a user may or may not be required to stage each page or sheet. In yet other embodiments, the electronic blueprint system 100 selects one or more pages for staging from each uploaded file constituting a group of system selected pages for each uploaded file that is less than the total number of pages for each uploaded file. For example, the electronic blueprint system 100 may select, at random or predetermined intervals (e.g., every $2^{nd}$, $5^{th}$, $10^{th}$ page), less than 100% of the pages for each file to be staged (e.g., 1%, 10%, 20%, and the like). In such embodiments, the user may need only stage each selected page or sheet selected by the electronic blueprint system 100 for each uploaded file. In yet other embodiments, the electronic blueprint system 100 enables a user to select one or more pages from each uploaded file.

In some embodiments, staging is a process where the data that was extracted automatically (e.g., sheet name), and data that was generated automatically during the upload process (e.g., hyperlink generation) is verified by the user. In embodiments where a subset of the whole is staged by system-selection or user-selection, the user is enabled to verify that the data that was automatically generated during the upload process is correct for the selected page(s) part of the subset for each uploaded file. In some embodiments, the non-selected pages of such an embodiment may be considered verified by the electronic blueprint system 100 only if the selected pages are deemed, by the user, to have been uploaded by the electronic blueprint system 100 free of error. In the event that any errors are found by a user during verification of selected pages, then the electronic blueprint system 100 may require the user to verify all pages of each file. In this way, the electronic blueprint system 100 enables a sample set of pages to be viewed and verified by a user to determine whether the batch (e.g., one or more files) was uploaded with or without errors thereby saving the user time and processing resources by requiring verification of only selected pages in certain circumstances.

Following this verification process (i.e., staging of the uploaded files), the electronic blueprint system 100 enables other users that have access to the project to view the verified pages. In other embodiments, the electronic blueprint system 100 enables users to view unverified pages. In such embodiments, the electronic blueprint system 100 may display a warning to the user that he or she is viewing an unverified electronic blueprint sheet. Such a warning may include a system-generated pop-up message requiring the user's acknowledgement. After verification (or in some embodiments, after upload without verification), the electronic blueprint system 100 determines if each sheet already has a version in the system (e.g., a previously uploaded sheet) based on, for example, the sheet name. In other embodiments, the determination of whether each uploaded sheet already has a version in the system occurs during the upload process. In such embodiments, the electronic blueprint system 100 enables the user to verify the versioning as well.

In some embodiments, the sheet name is a unique identifier for a particular project. Each electronic blueprint sheet may be hashed and keyed to the corresponding sheet name. Otherwise stated, the verified sheets are used to automatically version new sheets on top of their predecessors (if any). In some embodiments, the electronic blueprint system 100 asks the user to determine and select which uploaded pages are older or newer compared to existing pages in the system. In other embodiments, the electronic blueprint system 100 automatically determines which pages are newer and which pages are older based on a date of creation associated with each blueprint page. In some embodiments, the date of creation may be extracted as metadata during the processing by one or more workers.

In some embodiments, all captured data (e.g., annotations) in the system that was on any previous versions of blueprint sheets may automatically be promoted to the most recent version of the sheet, which may or may not be the uploaded pages. As used herein, annotation(s) refer(s) to any data added to an electronic blueprint sheet by a user such as, but not limited to, attachments, text annotations, area measurements, measurements, lines, or any other visual or non-visual data.

In one example, all of a user's annotations on a previous version of a blueprint sheet may be copied to the same location in the newer version of the blueprint sheet. Promoted data may be independent from the sheet that it was promoted from. For example, a text annotation may be promoted to the newest version of a sheet. However, deleting the text annotation in the old version does not delete the text annotation in the new version since they are independent annotations. Likewise, deleting the text annotation in the new version does not delete the text annotation in the old version since they are independent annotations. In other embodiments, promoted data may be dependent from the sheet that it was promoted from. For example, a measurement annotation may be promoted to the newest version of a sheet. However, deleting the measurement annotation in the old version deletes the measurement annotation in the new version, and vice versa, since they are dependent annotations. The electronic blueprint system 100 may enable a user to select whether data added by him or her (e.g., annotations, attachments, and the like) is independent or dependent across different versions of the same electronic blueprint sheet. The electronic blueprint system 100 may, by default, have the independent setting selected for the user. In some embodiments, only a project supervisor or the like may determine whether data input by a user is to be considered dependent or independent. Such a setting may be user-specific, project-specific, sheet-specific, or device-specific. For example, all data input by User A may be dependent, whereas all data input by User B may be independent.

It is understood that one or more uploaded pages may be the newest version of those pages, whereas one or more uploaded pages may not be the newest version of those pages. After the user has finished verifying the version, all users on the team may be notified. In some embodiments, notification may be sent via a notification stream that is displayed on each user's computing device that he or she is using to view, annotate, edit, or otherwise use the electronic blueprint pages provided by the electronic blueprint system 100.

Figure 5:
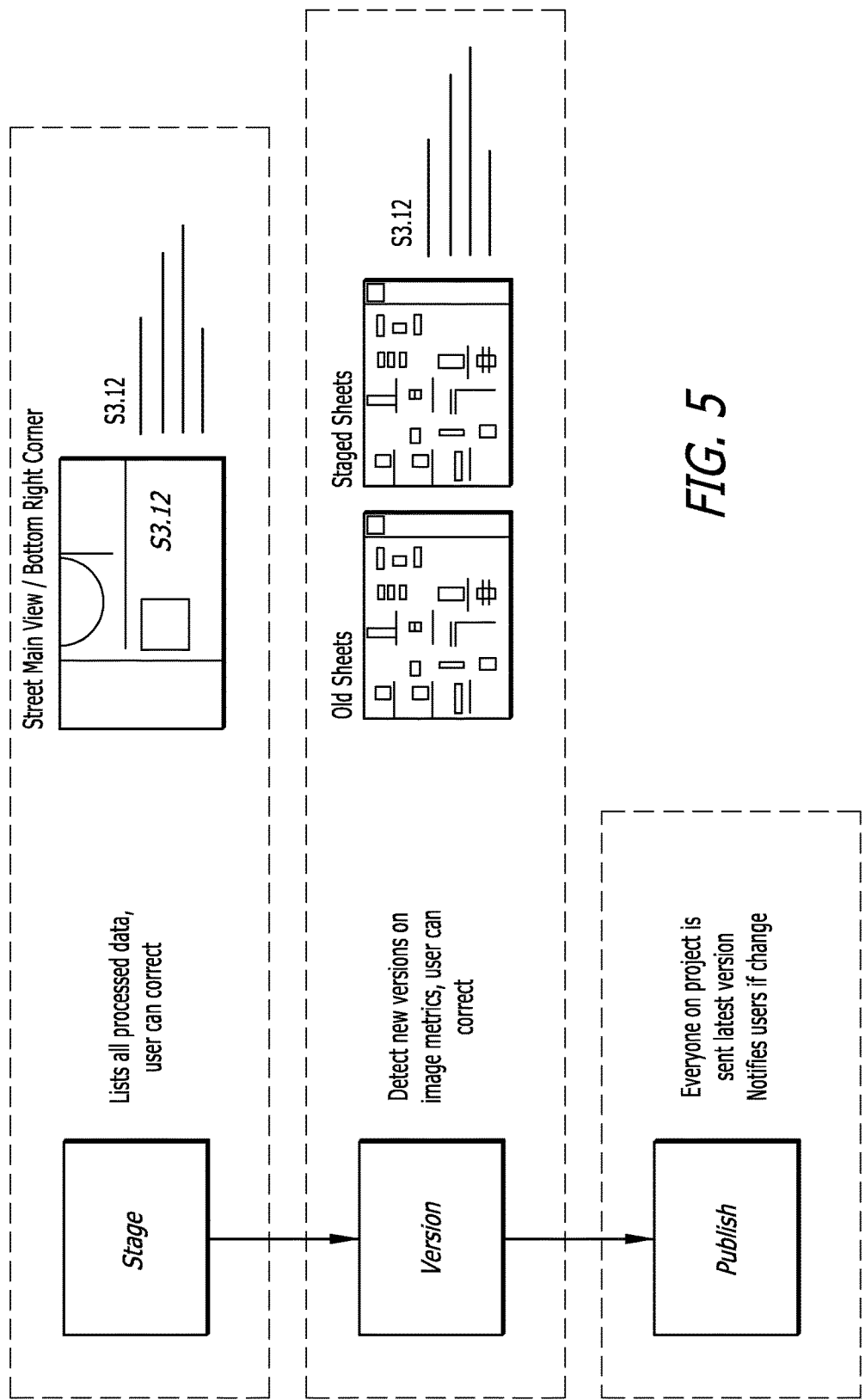
FIG. 5 is a flowchart of a method staging, versioning, and publishing a file.

In the event a conflict arises between different versions of the same electronic blueprint sheet, the user or the system may resolve the conflict. In some embodiments, the electronic blueprint system 100 may flag the conflict for the user. One example of a conflict includes when text annotations overlap each other. One embodiment of the staging, versioning, and publishing disclosed herein is shown in FIG. 5.

Figure 6:
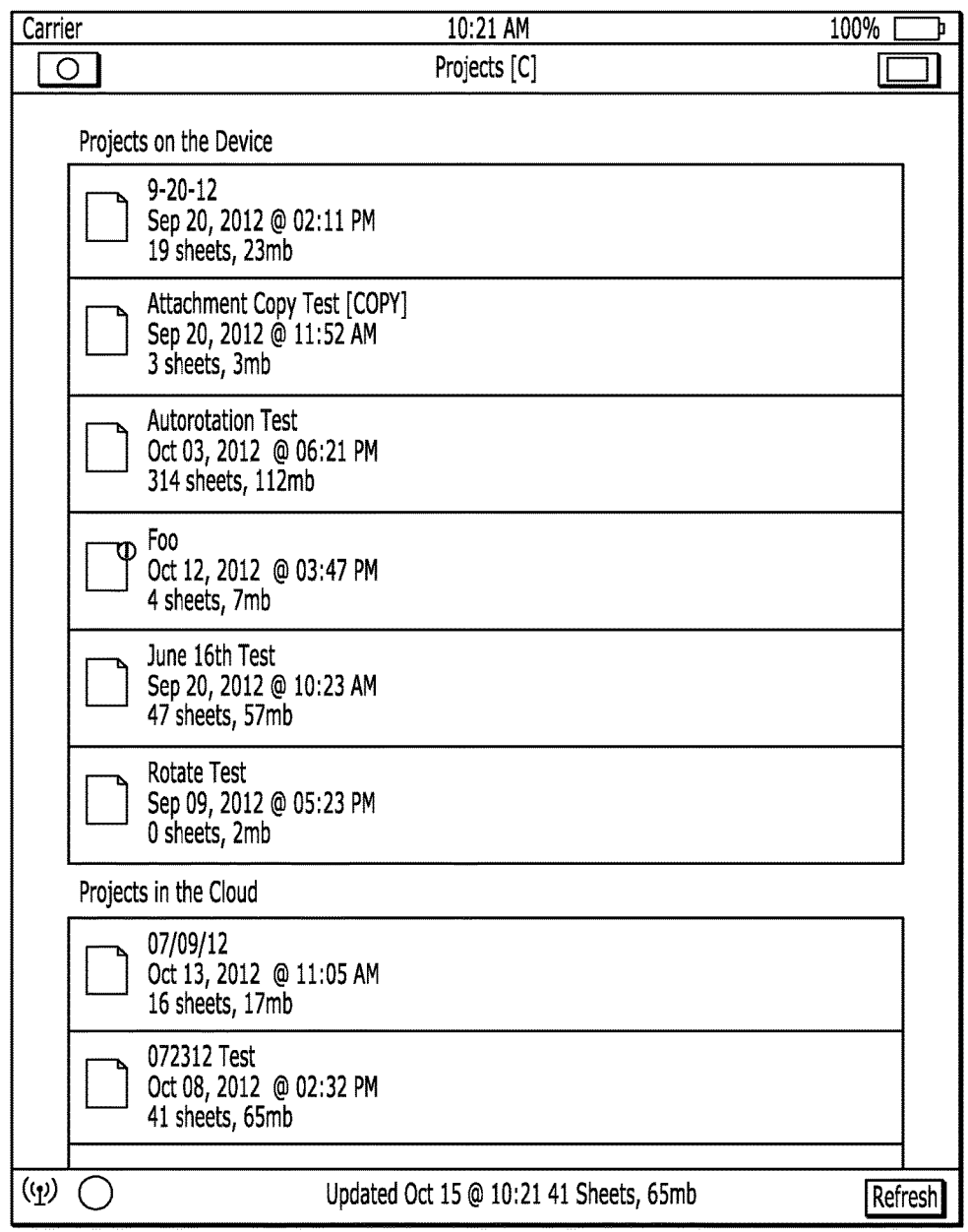
FIG. 6 depicts one embodiment of a graphical user interface displayed to a user browsing cached projects.

The electronic blueprint system 100 may include mobile application convenience. For example, a user may cache one or more projects for offline access. Caching a project downloads all related files, which may include all electronic blueprint sheets and any data added thereto by a user such as annotations, attachments, and the like. The electronic blueprint system 100 enables the user to browse cached projects via a graphical user interface. Upon connecting back to the cloud, the user may upload his or her sheets as new versions to enable other users to view any annotations added to the sheets while cached on the user's local device (e.g., while the user was in the field or on a job site without internet connectivity). FIG. 6 depicts one example of one embodiment of a graphical user interface displayed to a user browsing cached projects (i.e., the projects listed under "Projects on Device").

For example, the electronic blueprint system 100 enables a user to attach photos, audio, and other data. For example, progress photos may be attached to a sheet showing the progress of construction. Audio data may be attached to inform other users of a troubling sound coming from a certain location on a construction site in reference to the sheet. Therefore, not only does the electronic blueprint system 100 enable a user to attach data to sheets and projects, but the system further enables the user to select or otherwise associate at least one location on the sheet to which the attachment is related. For example, if an elevator shaft is producing a lot of noise during operation, a user may attach an audio file and a picture file to the sheet showing the elevator shaft. In addition, the user may select a location on the sheet to associate the attachments with that location. The selected location may include a graphical representation that is clickable or otherwise selectable. Upon selecting the graphical representation, the attachments may be opened. When more than one attachment is associated with a single location, the electronic blueprint system 100 may ask the user to select which attachment he or she desires to open.

Figure 7:
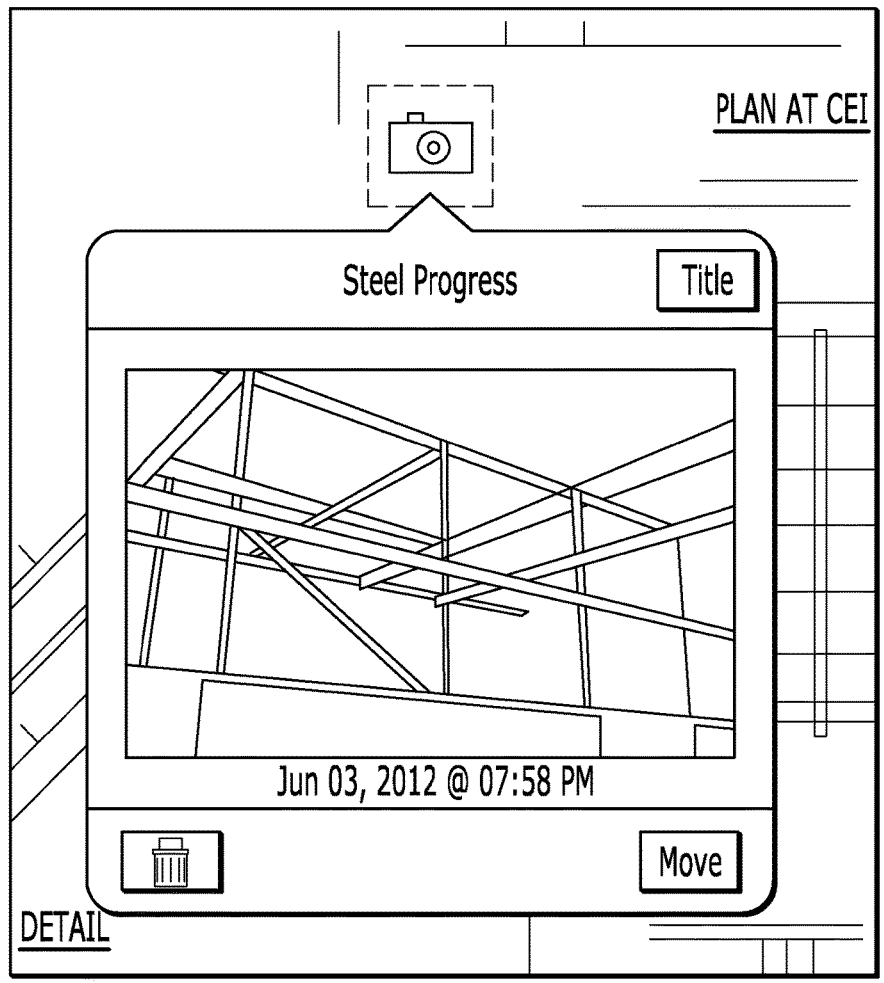
FIG. 7 is one embodiment of a graphical user interface showing a portion of an electronic blueprint sheet with a photo attached.

FIG. 7 is one example of one embodiment of a graphical user interface displayed to a user showing a portion of an electronic blueprint sheet in a portion of a viewport with a photo attached thereto. The photo may be stored on the device and auto-archived to a website associated with the electronic blueprint system 100 when the user has an internet connection. The website may have a searchable history of photos with blueprint metadata attached. In some embodiments, progress photos may be shown adjacent to related progress photos in a scrollable fashion to enable a user to quickly ascertain the progress being made over a period of time based on the time data of the photo (e.g., date and time photo was taken and/or attached to the sheet) and the photos themselves.

From a graphical user interface perspective, the electronic blueprint system 100 enables users to conveniently and efficiently browse all sheets of one or more projects. In some embodiments, the electronic blueprint system 100 utilizes a graphical user interface that displays a scrollable/pannable (i.e., one can pan the grid view in any direction to display more thumbnails) grid of one or more thumbnails to a user on his or her computing device via the display. Use of thumbnails in a grid view enables a user to easily see contextual information related to each sheet without having to open each sheet individually. In some embodiments, in addition to the contextual information set forth in the actual thumbnail (i.e., the mini-version of all or part of the sheet), the grid view may display one or more icons or other data with each thumbnail. The icons and other data represent data about the sheet in which it is associated. In this regard, the grid view saves system resources and bandwidth since less data is being processed or called upon than otherwise would be if the user had to open up each sheet to ascertain the contextual information provided in the grid view. One example of one embodiment of a graphical user interface grid view displayed to a user is shown in FIG. 8.

Figure 8:
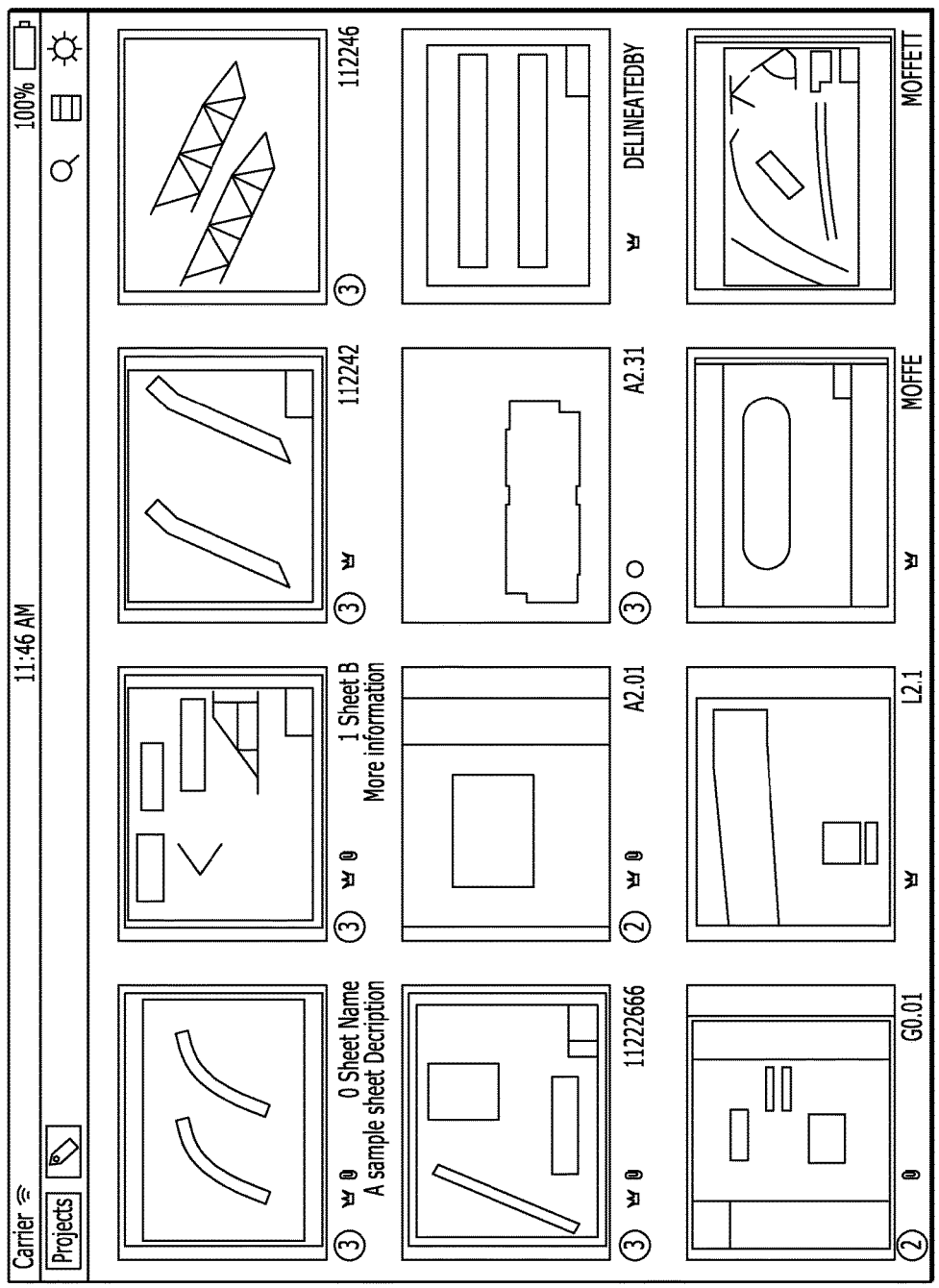
FIG. 8 is one embodiment of a graphical user interface grid view.

As shown in FIG. 8, there are three contextual icons displayed therewith: (1) the number three within a grey circle on the far left, indicating the number of versions, (2) a grey crown icon in the middle indicating that the sheet includes master annotations, and (3) a paperclip icon indicating that the sheet has an attachment. These thumbnails also include a sheet name and a subtitle. The sheet name for the thumbnail on the left is "0 Sheet Name" and the subtitle reads "A sample sheet Description." The next sheet name for the thumbnail on the right of the first thumbnail is "1 Sheet B" and the subtitle reads "More information." Other contextual icons may be used on the thumbnail grid, such as a solid dot indicating that the sheet contains annotations.

In other embodiments, different icons may be used. For example, in some embodiments, a user may configure his or her own icons and attribute meaning thereto. In such embodiments, the electronic blueprint system 100 may enable a user to create icons or select from a plurality of icons. Upon creating and/or selecting an icon, a user may attribute a meaning thereto. In some embodiments, the electronic blueprint system 100 provides a user a list of all available icons and all available icon descriptions such that the user is able to mix-and-match, and create his own customized iconography. For example, one user may prefer that the crown icon displayed above indicates the sheet contains annotations whereas the red circle icon indicates that the sheet contains master annotations.

In some embodiments, the number of thumbnails shown in the user's viewport may be set by the user. For example, the user may set the grid view to display a 1×1 (1 thumbnail is shown at a time but the user may scroll or pan to view other thumbnails), 2×2 grid (4 thumbnails shown with 2 columns and 2 rows), 4×4, 3×4, 4×3, and the like. In other embodiments, the electronic blueprint system 100 determines the number of rows and columns for the user based on, for example, the resolution the display on which the graphical user interface is to be displayed on the user's computing device, size of the display (e.g., length and width), available user input devices (e.g., keyboard, mouse, touch screen, microphone, touch pad, any other input device, or any combination thereof) on the user's computing device, or any combination thereof. In this regard, the electronic blueprint system 100 ensures (1) the grid view is displayed to a user such that the contextual information is ascertainable or otherwise readable by the user, and (2) the user is able to easily browse a plurality of sheets across a plurality of different devices. For example, the electronic blueprint system 100 may determine that the grid view is a 20×20 for a laptop computing device and 4×3 for a smart phone computing device since displaying a 20×20 array of thumbnails and contextual information may be unreadable by a user. Of course, the user may configure away from the system-selected settings in other embodiments to suit his or her own preferences.

In some embodiments, the thumbnail displayed in the grid view is the thumbnail generated during the initial upload of the page to the electronic blueprint system 100. In other embodiments, the thumbnail displayed in the grid view is a thumbnail that is re-generated for each version of a sheet as it is synced or otherwise uploaded from the field or job site. In this way, the thumbnail itself may display annotations. When a sheet has more than one version, the thumbnail associated with the most recent version may be displayed. In other embodiments, when a sheet has more than one version, the thumbnail associated with the version the user most recently accessed may be displayed.

In any event, the thumbnail may be a first image stored in a memory that is accessible over a communication path (e.g., system bus or network) by the computing device to display the grid view. The contextual information (e.g., one or more icons, sheet name, and subtitle) may be one or more images. For example, the electronic blueprint system 100 may analyze the data corresponding to a blueprint sheet to determine whether to flag certain information with an icon. In one embodiment, when a user adds an annotation to an electronic blueprint sheet, the system may set an annotation flag from "0" to "1." If the sheet contains no annotations as a result of deletion, the system may set the annotation flag from "1" to "0." Similarly, when a user adds a text annotation for the first time, the system may set a text annotation flag from "0" to "1." Likewise, when an attachment is added to a sheet for the first time, the system may set an attachment flag from "0" to "1." Every type of annotation may have a corresponding flag and/or counter. For example, a sheet with three photos attached to it may have the attachment flag set to "1" and/or the attachment counter set to "3." These flags and counters may be saved in a contextual information registry or table along with the sheet names and other data that the electronic blueprint system 100 may reference.

Upon determining the contextual information associable with the thumbnail image, the electronic blueprint system 100 may generate or access a contextual information image based on the determined contextual information. The contextual information image includes contextual information corresponding to the electronic blueprint sheet. The electronic blueprint system 100 may juxtaposition the thumbnail with the contextual image. As shown in the example embodiment above, the contextual information may be juxtaposed below the thumbnail. Of course, in other embodiments, the placement of the contextual information may be to the right, left, or above the corresponding thumbnail.

In other embodiments, graphical display fields attributable to each thumbnail may be toggled on or off based on the contextual information so that an image need not be generated. For example, if the annotation flag is set to 1 (or as the registry or table indicates likewise indicates), the electronic blueprint system 100 may display toggle an icon or field to display the corresponding icon. In such an embodiment, if four icons are displayed, then four separate images are displayed that removes the need to render a new contextual image every time a change occurring in the corresponding sheet changes the contextual information associated therewith.

While the embodiment shown herein depicts a single row of icons with the second row reserved for the subtitle, other embodiments of the grid view are configured to depict one or more rows of icons and other contextual information. For example, one sheet may call for three rows of contextual icons because of how many annotations the sheet contains whereas another sheet may only call for one or two rows of contextual information. In some embodiments, contextual information may be displayed next to, adjacent to, or juxtaposed to the corresponding thumbnail on one or more sides. For example, in some embodiments, the sheet name and subtitle may displayed above the thumbnail, and the contextual icons may be displayed below the thumbnail. It is also understood that contextual icons may be any shape, size, and color. It is also understood that contextual icons may be placed over the thumbnail itself such that the contextual icons may overlay the thumbnail. In some embodiments, the opacity of the contextual image(s) overlaying the thumbnail may be set so the contextual image is transparent to enable the user to see the detail underlying thumbnail image. For example, in one embodiment, all master versions of a sheet may include a contextual image indicative of such status. This contextual image may be a rectangular image having the same dimensions as the thumbnail image; may be of a transparent color such as red, green, blue, yellow, and the like; and may be positioned over the thumbnail image such that the entire thumbnail (or portion thereof in other embodiments) is perceived as being the transparent color.

Of course, in other embodiments, the user may select a specific sheet for viewing using a different graphical user interface. One such embodiment may include a list having a plurality of columns with the far left column being the sheet name with contextual information to the right of each sheet name. It is also understood that the user may view more than one sheet simultaneously. In one embodiment, the viewport is split into resizable portions that the user may or may resize. For example, a user may open a first sheet and a second sheet. The viewport or display may be divided in half with one half displaying the first sheet and the second half showing the second sheet. If a user opens up four sheets, the viewport or display may be divided into four resizable quadrants to respectively display one of the four opened sheets for viewing.

The electronic blueprint system 100 also enables a user to filter the sheets viewed in the grid view based on a project and many other criteria. For example, software instructions executed by a processor on one or more computer systems in the electronic blueprint system 100 enables a user to filter electronic blueprint sheets from one or more projects. The electronic blueprint system 100 enables a user to filter the electronic blueprint sheets based on, for example, data corresponding to each electronic blueprint page. Such data may include blueprint tags or any other data associated with electronic blueprint sheets. For example, a user may filter sheets based on those that have a sheet name starting with a particular letter. As another example, a user may filter sheets based on the date of creation, authorship, number of annotations (e.g., 0, 1, 5, 10, 100, and the like), type of annotations (e.g., measurements, attachments, markings such as drawn lines, master annotations, and the like), dots per square inch (DPI), text, original sheet size (i.e., the dimensions of the physical blueprint sheets such as 8"×11"), number of hyperlinks, floor level, part of building, number of stairs (e.g., based on image analysis), and the like. To accomplish filtering, a user may input data corresponding to the data he or she wishes the blueprint sheets to contain or not to contain. For example, a user may search for blueprints containing a text annotation reading, "Discuss with Supervisor." By filtering, a user can conveniently narrow down which blueprint pages are displayed and therefore relevant to the user.

Inputting data to define a filter, the user may use or otherwise manipulate an input device associated with the computing device (e.g., keyboard, mouse, or touchscreen). Thus, the user may input search criteria and execute a "Search," "Find," or any other function afforded to the user via a graphical user interface by execution of software instructions corresponding to an application associated with the electronic blueprint system 100 on a processor. Upon activating an input (e.g., pressing "enter," a mouse click, touch, voice command, or by other means) to execute the search, data corresponding to the user's search criteria (i.e., input data) may be transmitted to a server over a network or otherwise be processed locally by the computing device operated by the user. The server may receive and process the input data received from the user's computing device to determine what data to transmit or otherwise output back to the user's computing device. The user's computing system may receive and process the output data received from the server, which may result in a display of a map showing available properties corresponding to the search criteria such as a specific geographic region. Software instructions corresponding to various components or features of the graphical user interface cause the graphical user interface to be displayed to the user when executed by a processor. In the event the user is filtering cached data, it is understood that the user's device performs the filtering described herein.

Figure 9:
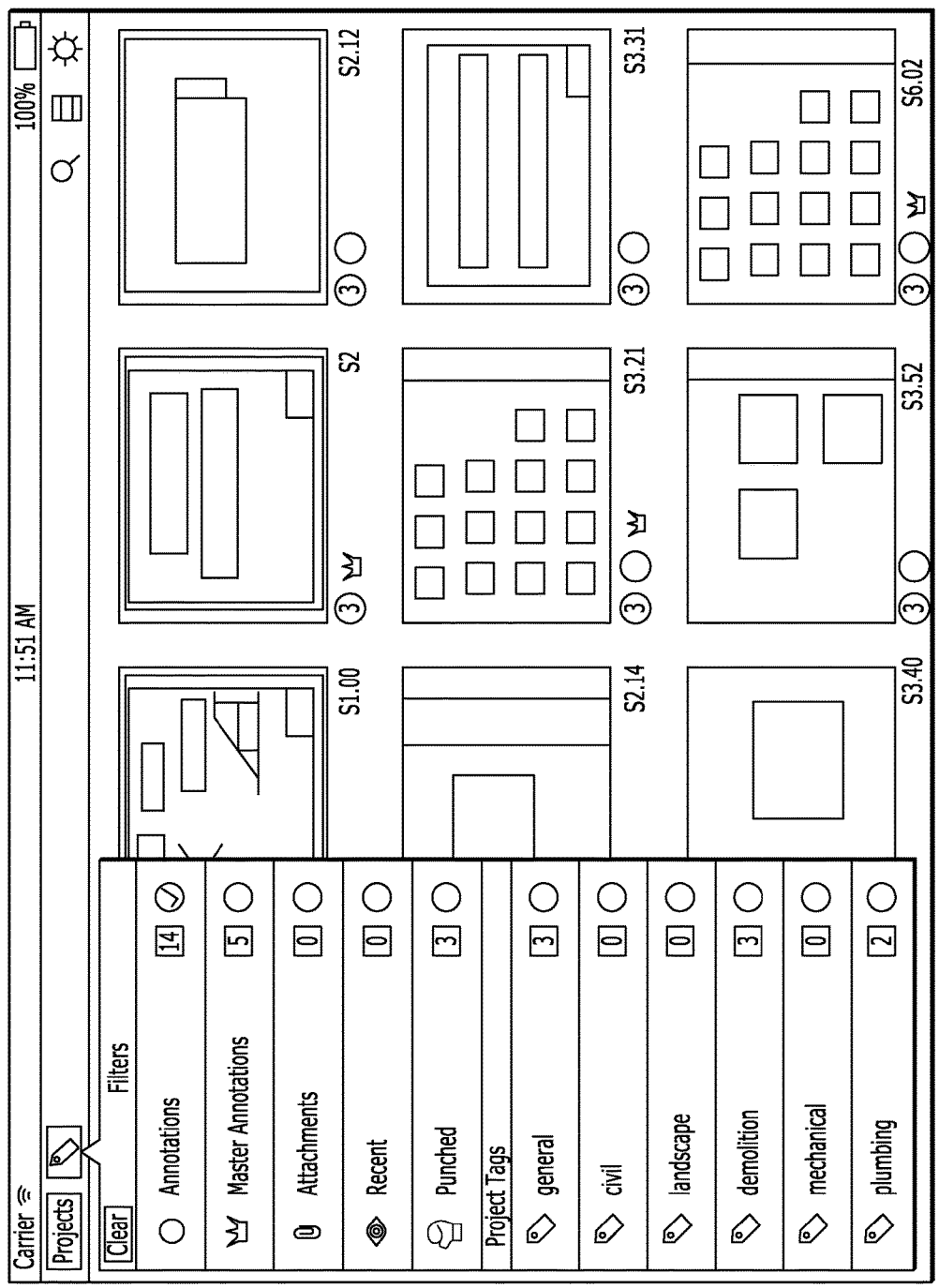
FIG. 9 is one embodiment of a graphical user interface grid view with filters displayed over the grid view.

FIG. 9 shows one example of one embodiment of a graphical user interface grid view displayed to a user with filters graphical user interface displayed over the grid view (in other embodiments, for example, the filter selection may be a side bar that may or may not affect the number of thumbnails displayed since it may or may not affect the viewport corresponding the display of the grid itself). As shown in FIG. 9, the user may select to filter the sheets displayed based on contextual information determined by the electronic blueprint system 100 (e.g., annotations, master annotations, attachments, recent, punched/stamped) and tags. Similar to the contextual information in sheets, a user may tag a document. A user may select from a plurality of existing tags or create his or her own. For example, the user may create a tag using any string of text. The electronic blueprint system 100 enables a user to tag a sheet or project (the latter may tag all sheets within the project, just the project itself, or both depending on the embodiment). In some embodiments, the user selects the tag using the graphical user interface displayed on his or her computing device to associate it with a sheet or project. A single sheet or project may have more than one tag associated with it. Similarly, when a user adds an annotation for the first time, the system may set a tag flag from "0" to "1" for the specific tag used. Every type of tag may have a corresponding flag and/or counter. The flags and counters for tags (another form of contextual information) may be saved in the contextual information registry or table.

As shown in FIG. 9, some options may be greyed out or otherwise unselectable since the contextual information is non-existent for a particular project or the sheets being displayed (i.e., the sheets that are browsable). Also shown, in some embodiments, the electronic blueprint system 100 informs the user how many sheets contain a certain type of contextual information before filtering the sheets or projects based on that criterion. The contextual information that the user may filter the sheets or projects with may also correspond with the contextual information displayed with each thumbnail. Some contextual information that the user may filter the sheets or projects with may not be available for display with each thumbnail. In some embodiments, the electronic blueprint system 100 enables a user to select whether he or she wants to search or filter cached blueprint sheets or the blueprint sheets on the server or both.

Users can filter data via "tags" and other contextual information quickly to view a subset of sheets or projects. Some embodiments may include a search feature and the ability to search, or otherwise filter, sheets or projects with Boolean search queries (such as AND, OR, AND NOT). The filter icons may match the icons on the grid view. In some embodiments, more than one filter or search criterion may be selected at a time.

From the grid view, the user may select an electronic blueprint sheet to open or otherwise view. A sheet viewer of the electronic blueprint system 100 enables a user to view one or more sheets from one or more projects on one or more displays of the user's computing device. In some embodiments, the sheet viewer enables a user to make annotations, flip through different versions of the same sheet, view related attachments, use tiles for fast viewing, and dynamically sizes objects based on the user's viewport. In some embodiments, the document viewer may enable users to draw on sheets with all annotations being automatically or manually synced with the server or cloud. The document viewer may enable users to measure distances linearly or via area. The document viewer may enable a user to attach data such as photos, audio, documents, and any other data. The document viewer may enable a user to make punch lists. The document viewer may enable a user to see a mini-map of his or her location on the sheet being viewed. The document viewer may enable text size annotations that may or may not be separated from standard font sizes.

The document viewer may use GPS data from the user's computing device or external device (e.g., from a GPS watch or other device that is connected to the user's computing device via a wired or wireless connection) to display relevant information. For example, in some embodiments, the electronic blueprint system 100 analyses GPS data and displays a sheet corresponding to that GPS data. In some embodiments, GPS data must be calibrated for each sheet. For example, a user may first be required to input one or more GPS coordinates to associate them with a blueprint sheet to calibrate. Continuing with the example, a user may take a first GPS measurement and select the location on the sheet at which the GPS data is associated with. The user may then take a second GPS measurement and select the location on the sheet at which the GPS data is associated with. GPS data may be synced with the server or cloud such that other users need not calibrate a sheet for GPS functionality. Once a sheet is calibrated for GPS functionality, the electronic blueprint system 100 may automatically display a relevant portion of the sheet based on GPS data corresponding to the user's location while viewing the sheet. For example, as the user walks through a job site, the document viewer may display a fixed distance away from the user centered on the user's location. In this way, the user may walk through a job site and the blueprint would move with the user such that the center of the screen represents his or her current location. In some embodiments, a triangle or other icon may be displayed to the user to indicate his or her location. In other embodiments, the blueprint does not automatically move, or otherwise pan, with the user's movement based on GPS data. Rather, the icon indicative of user location may change its location to account for the user's change in location on the mini-map or on the sheet itself.

The illustration of the document viewer according to one embodiment shown in FIG. 4 includes a mini-map 200 in the top left, a virtual key (which may be selected by clicking on, touching, or activating it by other means) labelled "Thumbs" that the user may select to navigate back to the grid view, various annotations, an annotation tool bar on the right, a document browser in the bottom right (the two opposing arrows), and various other features. The mini-map 200 indicates to the user his or her location on the blueprint sheet. Otherwise stated, the mini-map indicates the portion displayed in relation to the sheet as a whole. In the embodiment shown, the transparent rectangle 202 corresponds to the user's viewport or portion of the sheet viewed. As the user pans or otherwise navigates around the sheet, the transparent rectangle 202 (i.e., the viewport indicator or display indicator) moves accordingly. Likewise, if the user were to zoom in, the transparent rectangle 202 would become smaller, whereas if the user were to zoom out, the transparent rectangle 202 would become larger. In this regard, the viewport or display indicator is dynamic. The document browser may enable a user to browse between different, unrelated sheets. The document browser may enable a user to browse between different related sheets. Sheets may be related based on, for example, contextual information such as tags and other annotations. Sheets may be related based on falling under the same search or filter query. The document browser may enable a user to browse between different versions of the same sheet.

The illustration of the document viewer shown in FIG. 4 depicts one example of an area measurement 204 (one type of annotation enabled by the electronic blueprint system 100). In this embodiment, the area measurement 204 includes a line border with a measurement based on the line border and an automatic measurement calibration (based on analysis of the sheet itself without user input) or manual measurement calibration (the user inputs a manual measurement via an annotation). For a manual measurement calibration, the user may select the measurement annotation from the annotation tool bar. The user may specify whether he or she desires to calibrate the sheet or calculate a measurement. To calibrate the sheet, the user may place a manual measurement calibration on the sheet. The user may enter a known measurement corresponding to the manual measurement annotation (e.g., a distance measurement). In some examples, a user may physically measure something in the field or job site and input the actual measurement in the manual measurement annotation. In other examples, a user may rely on a key or scale on the drawing to determine the measurement value to input. Following the manual entry of the known measurement, the system may calibrate the sheet based on the manual measurement entered. In some embodiments, sheet calibration means that future measurements will refer to the manually entered value and distance or area measured. Otherwise stated, the system may extrapolate from the manually entered information. Following the sheet calibration, other measurements may be estimated and based on the manual calibration. In some embodiments, such estimates are good because an entire sheet is generally drawn to the same scale. Shown in FIG. 4, the area measurement 204 also includes the area measurement within the area measured. Here, the area measurement reads 64.7 square feet. The system may calibrate the sheet based on any measurement such as distance or area.

Figure 10:
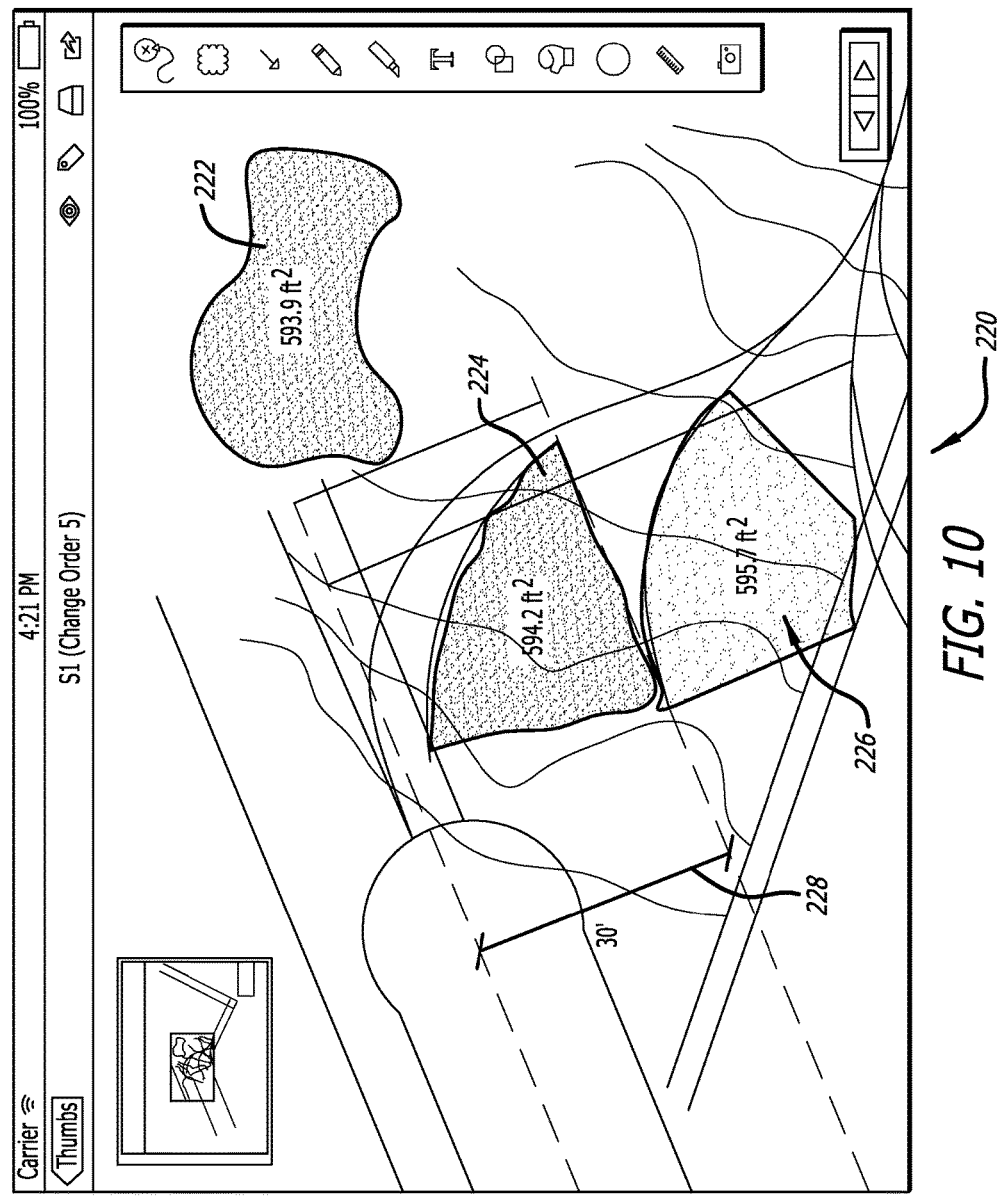
FIG. 10 is an illustration of the document viewer showing another example of an area measurement.

FIG. 10 depicts another illustration of the document viewer showing another example of an area measurement 220 (one type of annotation enabled by the electronic blueprint system 100). In the embodiment shown in FIG. 10, three area measurements 222, 224, and 226 are shown, each with a line border and a measurement based on a measurement calibration 228. In this embodiment, the measurement calibration is manual. It is understood that manual measurement calibrations and automatic measurement calibrations may be graphically represented differently. Here, the area measurement 222 reads 593.9 square feet based on the 30 foot calibration measurement 228. It is understood that the measurements herein are estimated values rather than exact values. Calculating estimated values instead of exact values saves valuable processing resources by not snapping the line border of area measurements to lines or other measurement points to lines or points on the blueprint sheets. Of course, other embodiments may implement "snap-to-line" techniques.

Figure 11:
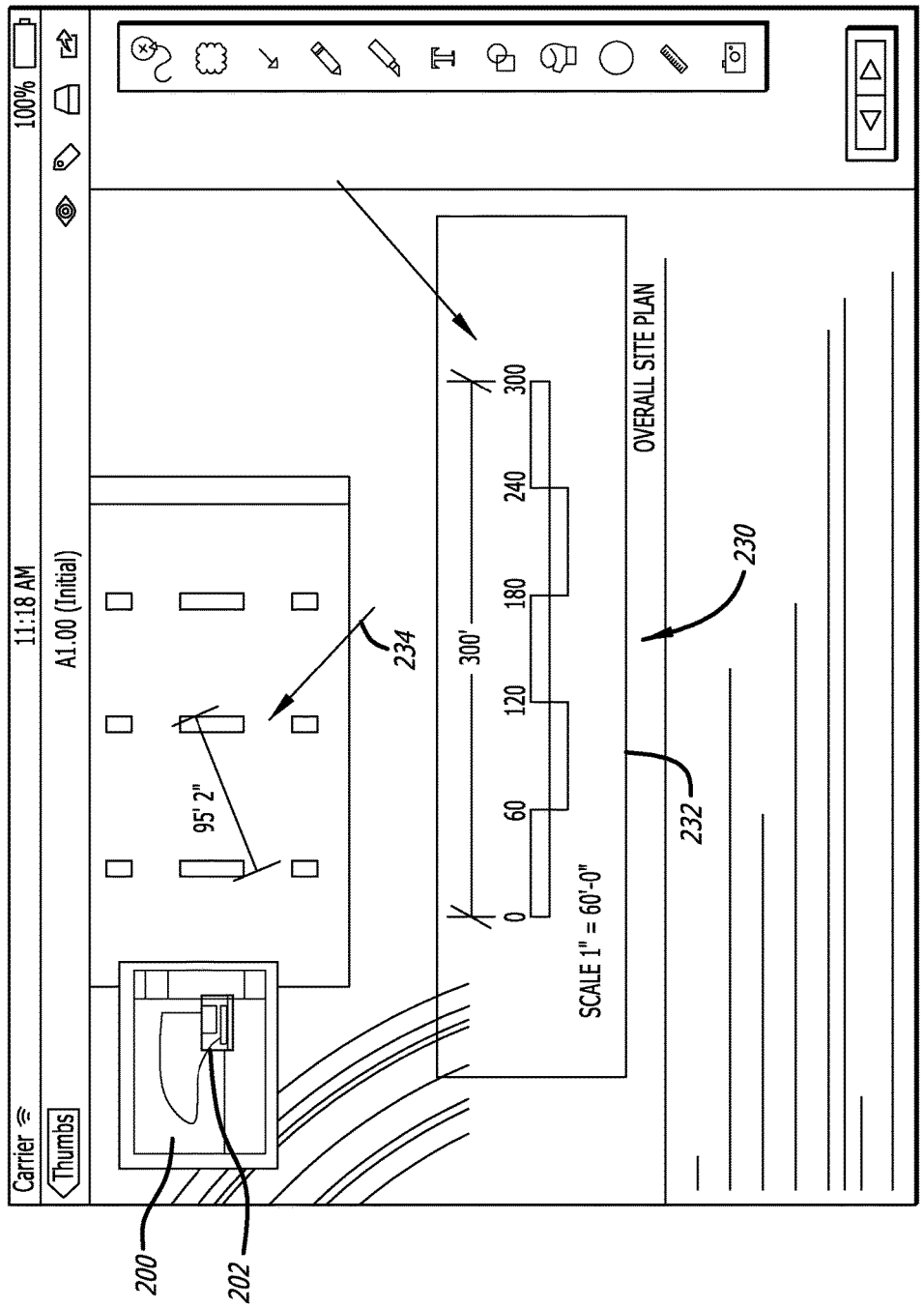
FIG. 11 is an example of an area measurement with a manual calibration measurement.

Another illustration of the document viewer according to one embodiment is shown in FIG. 11, which depicts another example of an area measurement 230 (one type of annotation enabled by the electronic blueprint system 100). In the embodiment shown in FIG. 11, a manual calibration measurement 232 is graphically represented with the 300 foot annotation. In this example, the user may have relied upon the scale on the drawing to determine the indicated distance is 300 feet. The 95 foot, 2 inches measurement 234 is an example of a distance measurement based on the 300 foot measurement.

In some embodiments, the electronic blueprint system 100 enables a user to drag their finger on a touch screen to virtually trace a freeform area. When the user lifts their finger, the area may fill in with a color and be measured based on a measurement calibration. The illustration of the document viewer according to one embodiment shown in FIG. 4 depicts an example of a "highlight" annotation 240 (one type of annotation enabled by the electronic blueprint system 100). In this embodiment, the "highlight" annotation 240 is a transparent or otherwise not fully opaque color. In some embodiments, the highlight width, color, and transparency/opacity may be configured by the user. Therefore, multiple "highlight" annotations 240 can be made on a file and each "highlight" annotation may be different.

Also shown in FIG. 4 is the ability for the user to draw shapes such as a rectangular cloud 242 and circle 244. Further shown is an example of a highlight annotation 240. Further shown is the placement of a photo icon 246 on the sheet. If the user were to click the camera icon 246, one or more photos associated therewith would be displayed to the user. Further shown in FIG. 4 is a manual calibration of 5 feet and a measurement of 9 feet that may be based on the manual calibration of 5 feet. It is understood that annotations are highly configurable by a user. Settings such as color, line width, transparency/opacity, bold, regular, italics, font size, and the like may be configured. Any feature associated with any annotation may be configurable. For example, the frequency of the ripples in the cloud may be configured. The user may select any shape and select whether he or she wants the cloud pattern or a straight line or the like. Annotations may be static or dynamic and may be configured as such. For example, a static annotation may include a still image such as a line or string of text. A dynamic annotation may include movement. For example, an annotation may include a red siren accompanied by sound and an animation (e.g., a rotating red light to indicate an emergency on the blueprint sheet). A dynamic caution annotation may include a rectangle filled with diagonal yellow and black lines with the word "Caution" centered therein. The yellow and black lines may move left-to-right as an animation to draw attention to the user.

It is understood that any configurable setting may be locked or otherwise prevented by an administrator or user. For example, a master annotation may be locked such that it can only be deleted, altered, or otherwise configured by an administrator such as a supervisor or manager.

It is also understood that the user may search or filter based on the type of annotation. For example, the user may choose to search for sheets having yellow highlighting. As another example, the user may choose to search for sheets having annotations authored by a certain person. It is also understood that a user may turn on or off annotations based on type, authorship, project, sheet, and the like. In some embodiments, master annotations cannot be turned off (i.e., removed from the display but not disassociated with, or otherwise deleted, from the sheet itself).

Regarding text sizes for text annotations, when the user creates a text annotation, the font size is dynamic. In some embodiments, the electronic blueprint system 100 determines the appropriate font size for the user. In some embodiments, the user cannot select the text size or font size. In some embodiments, the system determines the appropriate font size to prevent the user from having to guess the appropriate font size. For example, a 12 pt font may be incredibly small in a view port displaying a sheet derived from a 42"×32" physical sheet.

In some embodiments, the algorithm for calculating the appropriate or correct text size may include:

FONT_SIZE=DOCUMENT_HEIGHT×SIZE_SCALE_FACTOR

In one embodiment, SIZE_SCALE_FACTOR may be the value of a 16 pt font at a given zoom level. DOCUMENT_HEIGHT may be the document height in pixels. The font size may automatically be selected for the user based on their zoom level. This is done by segmenting the fonts into more than one font size (e.g., 2, 3, 4, 5, or more), and figuring out the user's zoom level and picking the appropriate font size in the segment. In some embodiments, the electronic blueprint sheet enables a user to perceive font sizes as if they were the same size no matter the zoom level. For example, the two images below provide one example of one embodiment with four segmented font sizes keyed to four different zoom levels. When zoomed at 0%, the Large text size may be perceived as the same size as the X-Small text size when the user is zoomed in at 100%. In this regard, the text sizes may be proportional to the zoom level.

Figure 12:
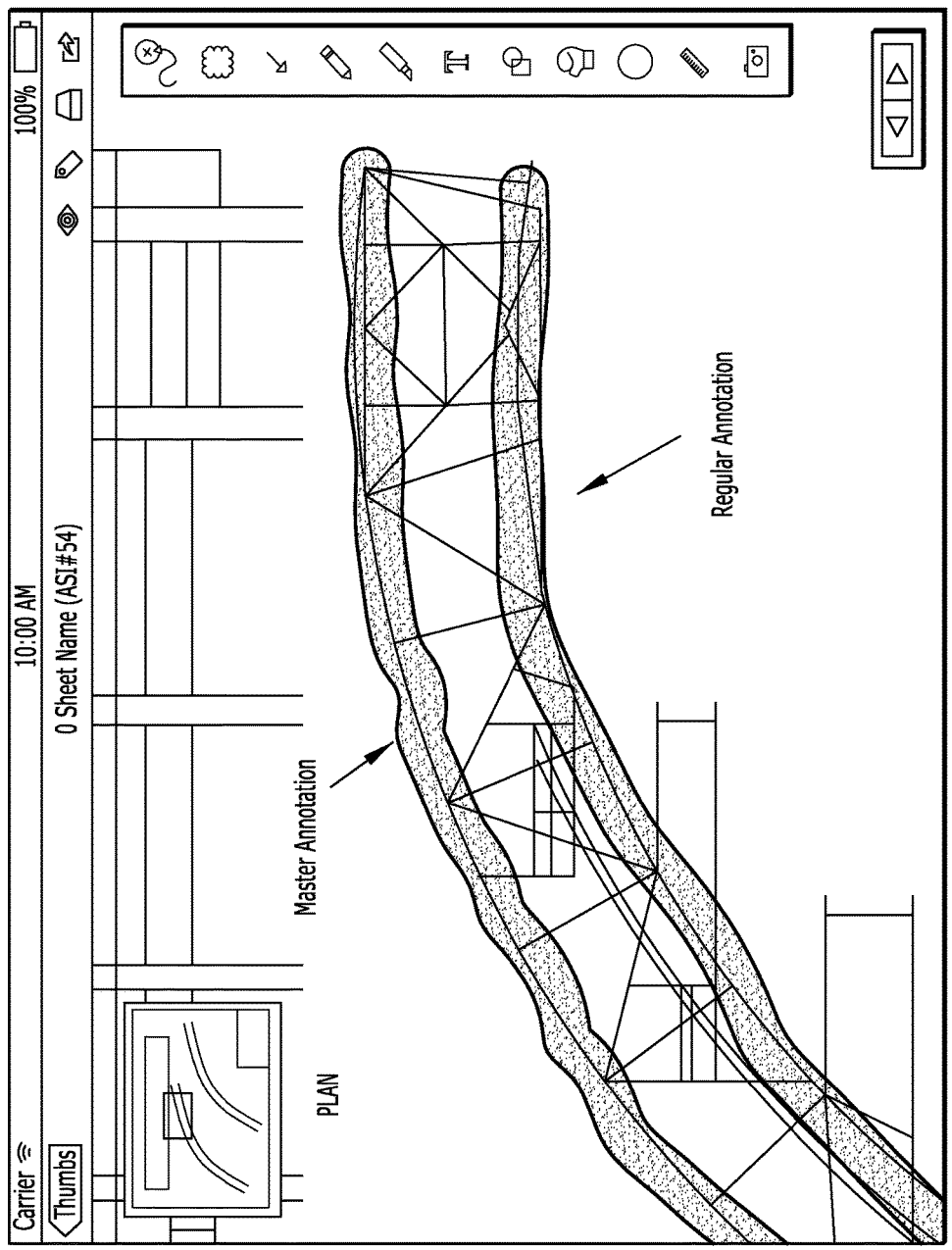
FIG. 12 is one example of a graphical user interface comparing a master annotation to a regular annotation.

FIG. 12 is one example of one embodiment of a graphical user interface displayed to a user on his computing device showing one example of one embodiment of a master annotation compared to a regular annotation. Master annotations are special versions of annotations that may be visible on all collaborator's documents, and may be visually differentiated using a darker color. The master annotation shown in FIG. 12 may be visible to every user on a project where the regular annotation may only be visible by the single user viewing his or her display (i.e., the regular annotation may be the user's own annotation that has not been converted into a master annotation). Regular annotations may be "pushed master" in bulk (e.g., per type of annotation, per sheet, per project, or entire database) or one annotation at time. A permission list may be maintained such that only users on the permission list may push one or more annotations to master.

Figure 13A:
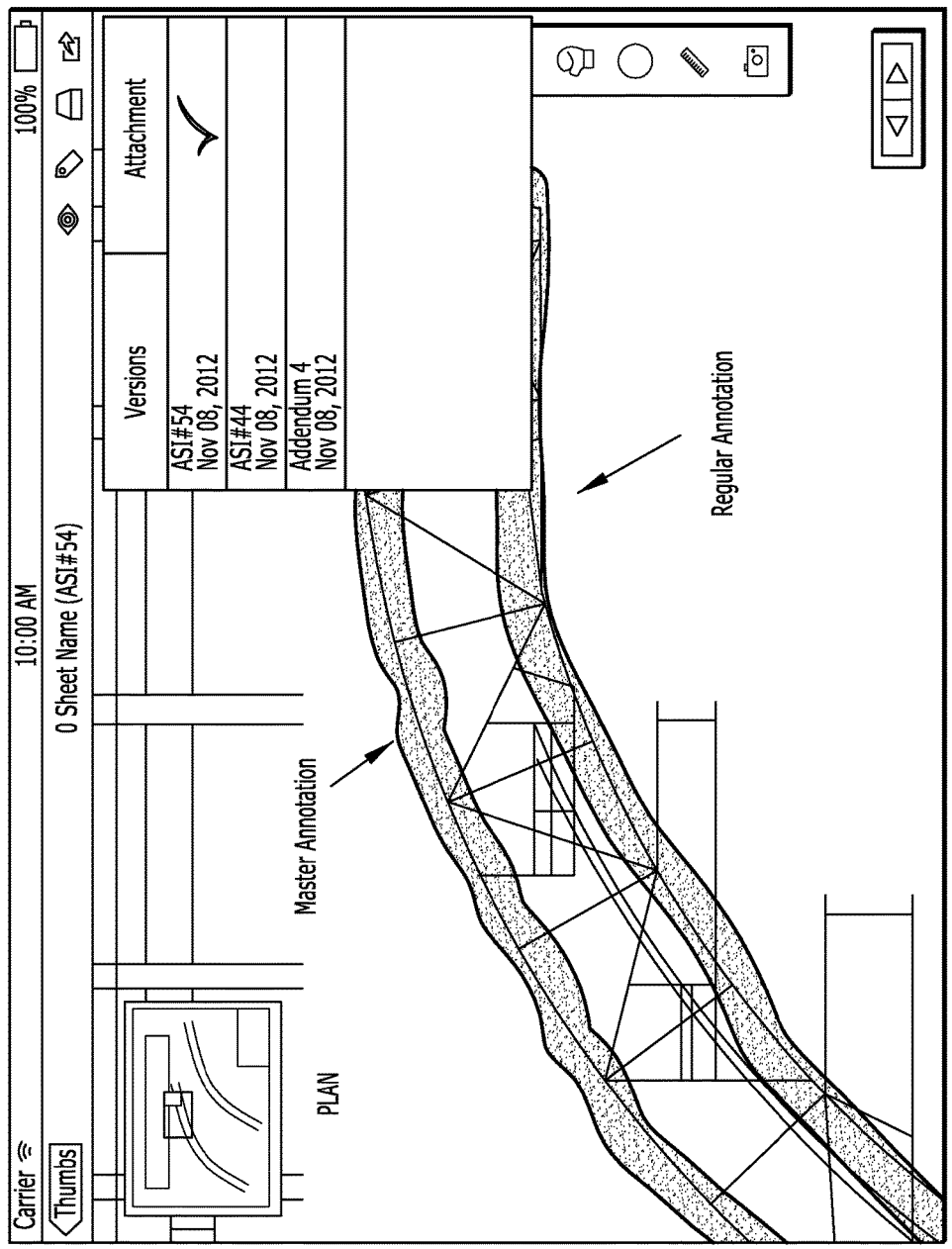
FIGS. 13A and 13B show the comparison of different versions of a document.
Figure 13B:
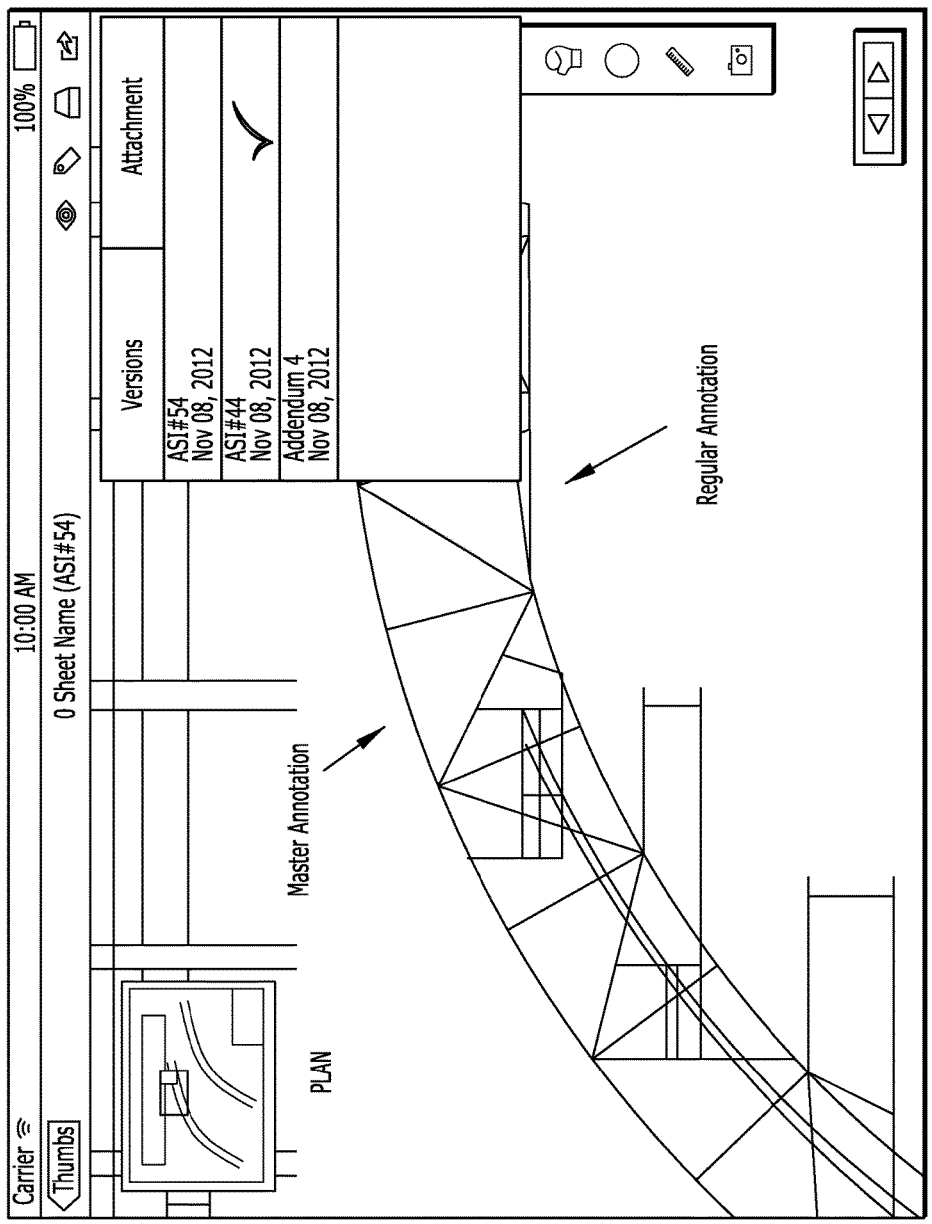

The electronic blueprint system 100 enables a user to easily compare two or more versions of the same document. In one embodiment, where two sheets are not juxtaposed or shown simultaneously, the document viewer "flips back in time." The user's viewport settings may be preserved, such as translation (panning) and scale (zoom), to enable the user to easily differentiate between two different versions of the document. As the user switches between the different versions, the difference in annotations will be readily apparent since the user does not need to re-pan the sheet to display the sought after region he or she was interested in comparing. The comparison of different versions is shown in FIGS. 13A and 13B. FIG. 13A depicts the viewpoint of a newer version of the document and FIG. 13B depicts the viewpoint of an older version of the document.

The electronic blueprint system 100 enables issue tracking via a punch list/task list. In some embodiments, issues may be tracked by creating punch list stamps. A stamp is placed on a sheet similar to how an annotation may be added. For example, in some embodiments, a user may select a stamp and select the location at which the stamp should be placed on the sheet. In response to the user's input, the electronic blueprint system 100 may place the selected stamp on the sheet at the user's selected location. The graphical stamps may be visually represented by a circle with two letters in it according to one embodiment. In one embodiment, a user may customize his or her stamps for a project or sheet by choosing what letters go into the specific circle and by setting project specific defaults. For example, a user may create custom stamps using a stamp template or wizard, which may walk the user through requirement components of a stamp. In some embodiments, the required components may include the stamp's name and a one or more letter abbreviation. The user's custom stamps may be visible to all users on a sheet or a project via the website or the app. A user may select from the customized lists of stamps and pins one or more stamps on a blueprint sheet. The name or title of the stamp may be populated from a previous user's customization. Created stamps (i.e., stamps that are available for selection for placement) and pinned stamps (i.e., stamps that have been placed on a sheet or associated with a project) may automatically be synced to the cloud or server (e.g., website) to one or more master lists. There may be a master list including all stamps regardless of sheet or project and regardless of how many users may have created them. The master list may be project-specific, sheet-specific, or user-specific. Each stamp may get a unique identifier (e.g., an identification number). Users may search or filter one or more master lists by any stamp attribute (e.g., stamp name, ID number, title, resolution status, blueprint sheet number, stamp description, stamp creator, assignee, assignor, and any other attribute).

A user may attach data (e.g., one or more photos, audio files, documents, or any other data) to a punch list task or a punch list itself. A user may be assigned one or more issues (e.g., one or more stamps) to be resolved by an assignor (i.e., another user such as a supervisor or project manager). The assigned one or more issues may automatically be displayed on the assignee's computing device. The status associated with each stamp may be represented via iconography. Otherwise stated, the punch list icons depicted on sheets may visually change based on the status of the issue corresponding to the stamp. When a user selects a stamp, it may low-light the other non-selected stamps (e.g., grey-out) as shown in one of the illustrations below.

Figure 14:
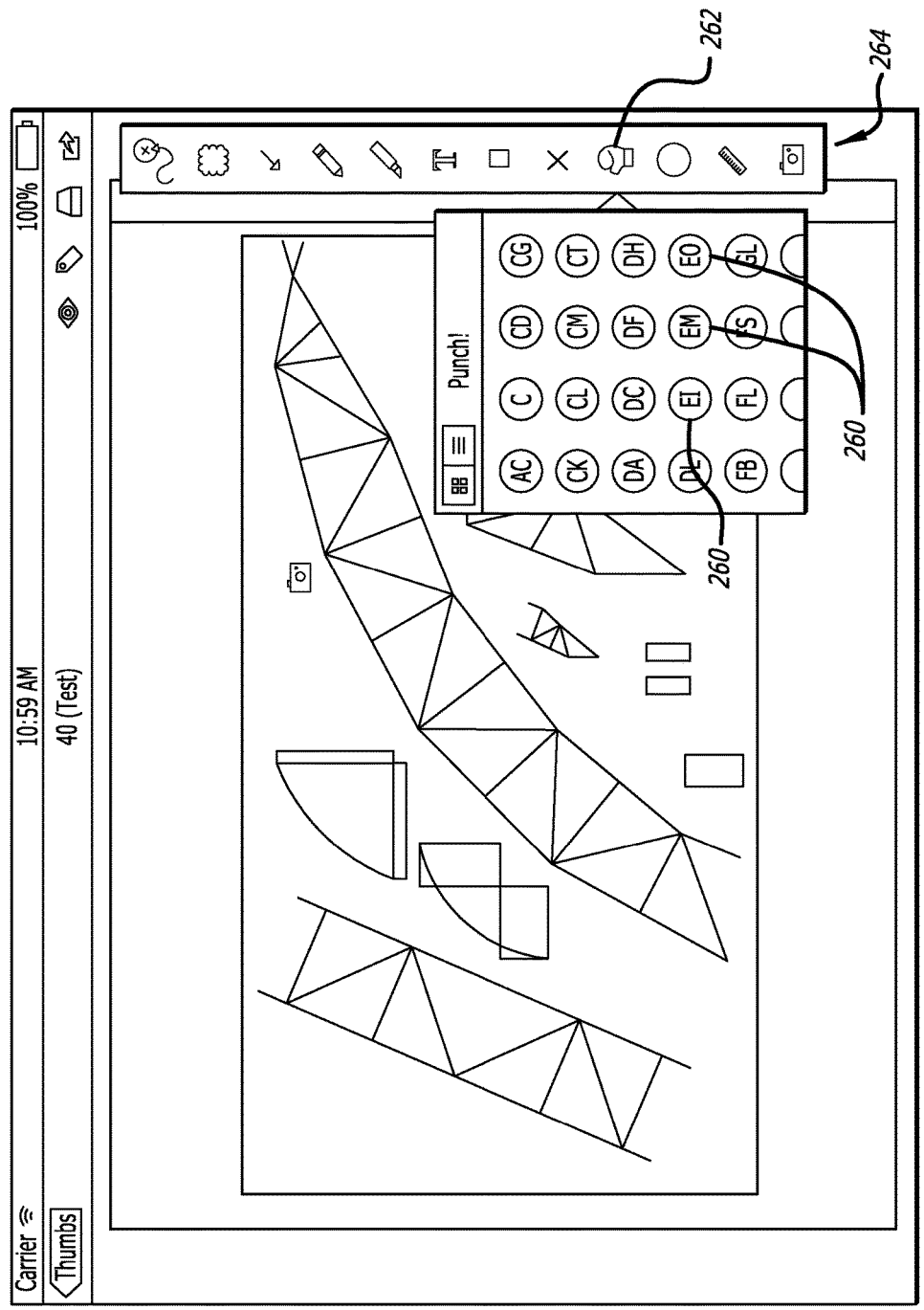
FIG. 14 depicts a graphical user interface that enables a user to select a stamp to pin on the electronic blueprint sheet.

FIG. 14 shows one embodiment of a graphical user interface that enables a user to select a stamp 260 to pin on the electronic blueprint sheet after the user has selected the punch input 262 on the annotation toolbar 264. It has been contemplated that the graphical user interface may enables a user to create, search for, and select a stamp to place on a file.

Figure 15:
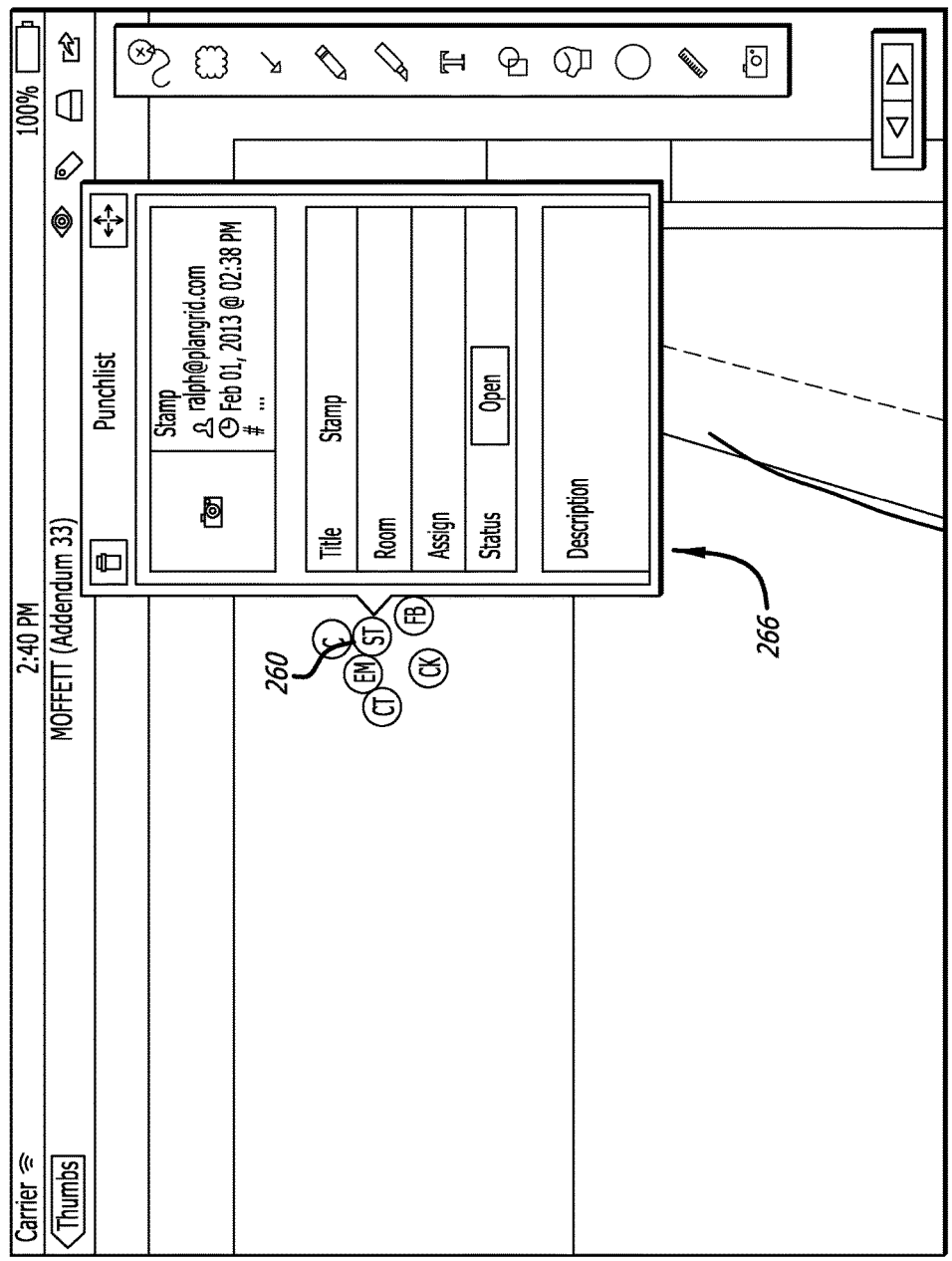
FIG. 15 is one example of a viewport showing a stamp on an electronic blueprint sheet.

FIG. 15 is one example of a viewport showing a stamp 260 on a sheet. It is understood that a stamp is a type of annotation. As shown, the stamp 260 is selected, which brings up a punch list window 266. The window may provide details such as title, room, assign, status (red text reads "Open"), and description as shown. The window may provide details such as the stamp name (titled "Stamp" in this example); the person who pinned the stamp on the sheet, and the date the stamp was pinned on the sheet. The window may provide a virtual camera key that a user may select to associate one or more photos or other data to the stamp.

FIG. 16 is one example of a viewport showing a portion of a master sheet with five placed stamps. The first row stamp named "Stamp," was assigned an issue ID number of 95, is placed on sheet a titled "S1," and its status reads "OPEN." The second row stamp named "Ceiling Drywall," was assigned an issue ID number of 94, is placed on a sheet titled "A2.31," and its status reads "OPEN." The third row stamp named "Door Closer," was assigned an issue ID number of 93, is placed on a sheet titled S6.15, and its status reads "OPEN." The fourth row stamp named "Ceiling Drywall," was assigned an issue ID number of 92, is placed on a sheet a sheet titled "S6.15/200," and its status reads "IN REVIEW." The fifth row stamp named "Door Adjustment Needed," was assigned an issue ID number of 91, is placed on a sheet titled "0 Sheet Name," and its status reads "OPEN." Of course other status may be displayed such as, OPEN, IN REVIEW, DONE, COMPLETE, IN PROGRESS, PENDING, CLOSED or any other status word or phrase.

Figure 17:
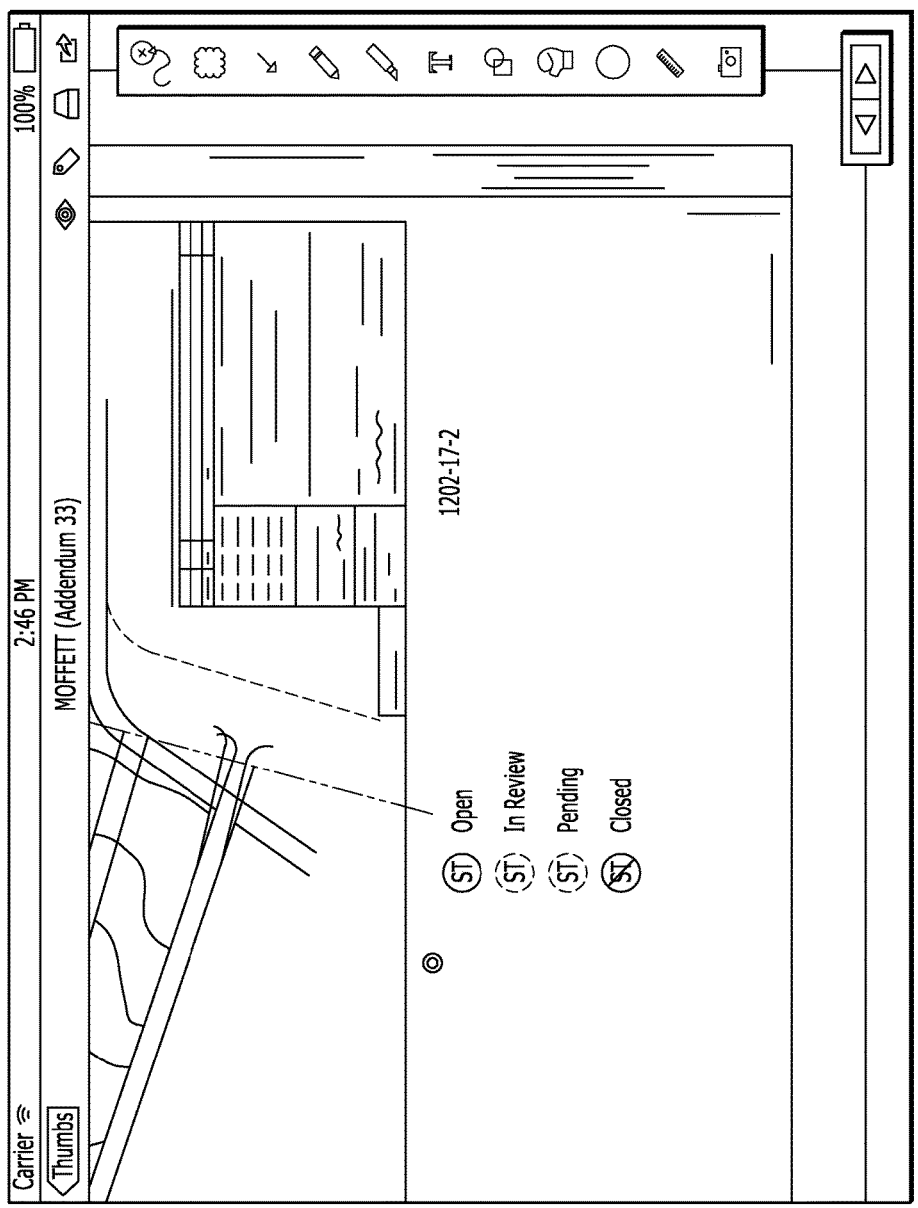
FIG. 17 is one example of a viewport showing a portion of a master sheet with the "ST" stamp depicted with four associated status icons.

FIG. 17 is one example of a viewport showing a portion of a master sheet with the "ST" stamp depicted with four status icons associated therewith. The electronic blueprint system 100 may display the icon corresponding to the status of the stamp.

Referring now to text extraction (e.g., extracting a unique identifier such as a title), which may occur during or after the uploading of one or more blueprint files, the electronic blueprint system 100 enables extracting text from an electronic blueprint page and associating extracted text from a page with that page. In some embodiments, versioning blueprint sheets may be dependent on associating extracted text (e.g., a unique identifier such as sheet name). Sheet names may be unique to each sheet in a project. Sheet names may be coded which enables construction workers to know what each sheet represents. The sheet name may be compliant with a standard. In one embodiment, the standard may include the United States National CAD Standard and any conventions thereunder (e.g., the Uniform Drawing System). Sheet names may include a discipline designator (e.g., G for general, A for Architectural, C for civil), a sheet type designator (e.g., G for General, 1 for Plans or horizontal views, 2 for elevations or vertical views), and a sheet sequence number.

When the user selects at least one file to upload to the system, the user may specify whether the selected files to be uploaded are compliant with any standard format, naming of each sheet, and the like. If the user is unsure of whether the files selected for uploading are compliant with a specific standard, the electronic blueprint system 100 enables the user to specify the region on each page at which the sheet name resides (e.g., lower-right, lower-left, upper-right, upper-left, or varies) and even input an example sheet name format by inputting an example sheet name. User inputs such as these received before the files are uploaded may affect one or more uploading processes performed by the electronic blueprint system 100. For example, if the user specifies the sheet names for each page in a blueprint file are in the lower-right corner of each document, the electronic blueprint system 100 may only process a region on each page corresponding to the lower-right corner to extract the sheet name on each page instead of analyzing a region in each corner of each page. As another example, if the user inputs a sample sheet name format followed by each page in a blueprint file, the electronic blueprint system 100 may heuristically score strings of text accordingly (i.e., place greater weight on a string of text that matches or is close to the format input by the user). Therefore, it is understood that the electronic blueprint system 100 may extract text based on a naming convention standard, a format convention standard, any other standard, or any data received from a user.

In some embodiments, the electronic blueprint system may have one or more costs attributed to it (e.g., a monthly fee to use the system and methods corresponding thereto). The one or more costs may be discounted on accord of each page in a blueprint file conforming to or otherwise complying with a naming convention standard or a format standard (e.g., name is always lower-right).

Extracting a sheet name is difficult because the sheet name is generally amongst other text, so the electronic blueprint system implements techniques to select the proper text (i.e., the sheet name instead of the address). The electronic blueprint system analyzes various criteria to heuristically determine the sheet name for each uploaded page of a blueprint file. For example, the electronic blueprint system may determine that it has found a string of text that reads "Sheet No." In such a situation, the electronic blueprint system may heuristically determine that a string of text adjacent thereto is most likely to be the sheet name. FIG. 18 is but one example of a title block in a blueprint sheet (with B105 representing the desired sheet name).

In some embodiments, sheet name extraction may vary based on the electronic blueprint system determining whether the blueprint file is image-based (i.e., the pages do not explicitly store embedded text strings along with position and location information) or vector-based (i.e., the pages explicitly store embedded text strings along with position and location information). Optical character recognition, character concatenation, or computer vision may be performed on image-based blueprint files. Optical character recognition, character concatenation, or computer vision may not be performed on vector-based blueprint files.

A blueprint page may be pre-processed using adaptive thresholding and rank filtering to binarize the image (i.e., the blueprint sheet) and reduce noise. Connected components processing may be used to define potential character regions. Statistics of the potential characters may be computed based on their size, area, density, location, shape, proximity to other characters, and the like. These statistics may be used by the electronic blueprint system 100 to eliminate non-characters from consideration. These statistics may be used by the electronic blueprint system 100 to rank potential characters based on the possibility of such characters being a part of a sheet name. This ranking and elimination may be performed based on a heuristic function of the statistics, or by a machine learning ranking algorithm such as SVMrank or ListNet. The ranked potential characters may be used to build strings of text (for example, concatenate characters) that may constitute a sheet name. FIG. 19 is one example of a title block with boxes drawn around characters that may be high ranking for sheet name extraction in this image.

The remaining ranked potential characters may be processed one-by-one to string characters together. Confusion sources (e.g., handwriting, scan noise, compression artifacts, annotations from the image, and the like) may be filtered out from the image by, for example, keying on the width of the character of interest, and filtering out things that are significantly thinner than the character of interest. Note that in some embodiments, the character of interest may be of interest because it has a high score from, for example, a heuristic scoring algorithm. The approximate width of the character may be computed, and the image may be filtered with morphological filters. A string may then be built up character by character by searching for surrounding characters which are in close proximity and align with the character of interest. String growth may be stopped when, for example, significant white space or a specific object such as a boundary line is encountered. String building may start left and right. If no other characters are found, building up and down may be attempted. Statistics of the string may be computed such as height, width, number of characters, distance from the corner, character area, and the like. Similar to character ranking, the strings may be ranked by either a heuristic function of the statistics or by training a machine learning algorithm with statistics. Optical character recognition may be performed on the strings. For example, the strings may be run through an OCR algorithm to convert the character images to text.

Statistics based on the text may be computed, such as the number of periods or dashes, the number of letters, the character the line starts with, and the pattern of the characters. The orientation (i.e., up-down or left-right) of each string of text may be used as a feature (i.e., a statistic computed from the character image or text string such as area (number of pixels), character height, number of letters, and the like) for each string since left-right is more common. Contextual statistics may be computed, such as whether the string of text of interest is associated with a box, or the proximity of other identifying text (e.g., "Sheet Name" or "Drawing Number"). The text statistics may be combined with the computed character statistics. These statistics may be ranked. The highest ranking string of text may be output as the sheet name. Common words which are obviously not sheet names such as "North," "Avenue," "Scale," or other words are searched for and given a low rank. The electronic blueprint system may build a list of words to be excluded from consideration in memory that may be referred to each time a new blueprint file is uploaded.

Some blueprint pages, when scanned or printed to PDF, may not default to the landscape orientation (i.e., they need to be rotated by 90, 180, or 270 degrees for proper orientation). Automatic rotation may be performed for sheets not properly oriented by performing sheet name extraction on the regions of interest in the sheet. Regions of interest may include statistical features of portions of the image along its edges. These statistical features may include 1-D and 2-D regional densities, string and box detection, the number and quality of potential characters (based on, for example, statistical analysis disclosed herein).

In one embodiment, four corners of a sheet are run through an OCR algorithm or sheet name extraction algorithm for each of the four possible rotations. The electronic blueprint system may identify incorrectly rotated characters. The correct rotation may be indicated by the region of interest that provides a high quality sheet name with, for example, the OCR indicating the fewest number of rotated characters. In some embodiments, the electronic blueprint system determines the presence of common words found in blueprints, and can be used as a positive indicator of correct rotation. Indicators of correct orientation may be combined with a heuristic scoring function to rank the possible rotations and regions of interest to select the best one. A machine learning ranking algorithm could also be used.

With vector-based PDFs, the dominant orientation of all the strings (i.e., up-down or left-right) may be determined by the electronic blueprint system 100 by using statistics (i.e., statistically analyzing) based on the size and location of the strings. Strings of interest may be rasterized (i.e., converted to an image) out of the PDF to be run through an OCR algorithm to check for the correct orientation of the image. The corner where the best sheet name comes from may be indicative of how the sheet needs to be rotated. For example, finding a reasonable sheet name in the upper right corner of a blueprint sheet that is in a Portrait orientation, may indicate that the sheet needs to be rotated 90 degrees clockwise so that the sheet is now in a landscape orientation.

Figure 20:
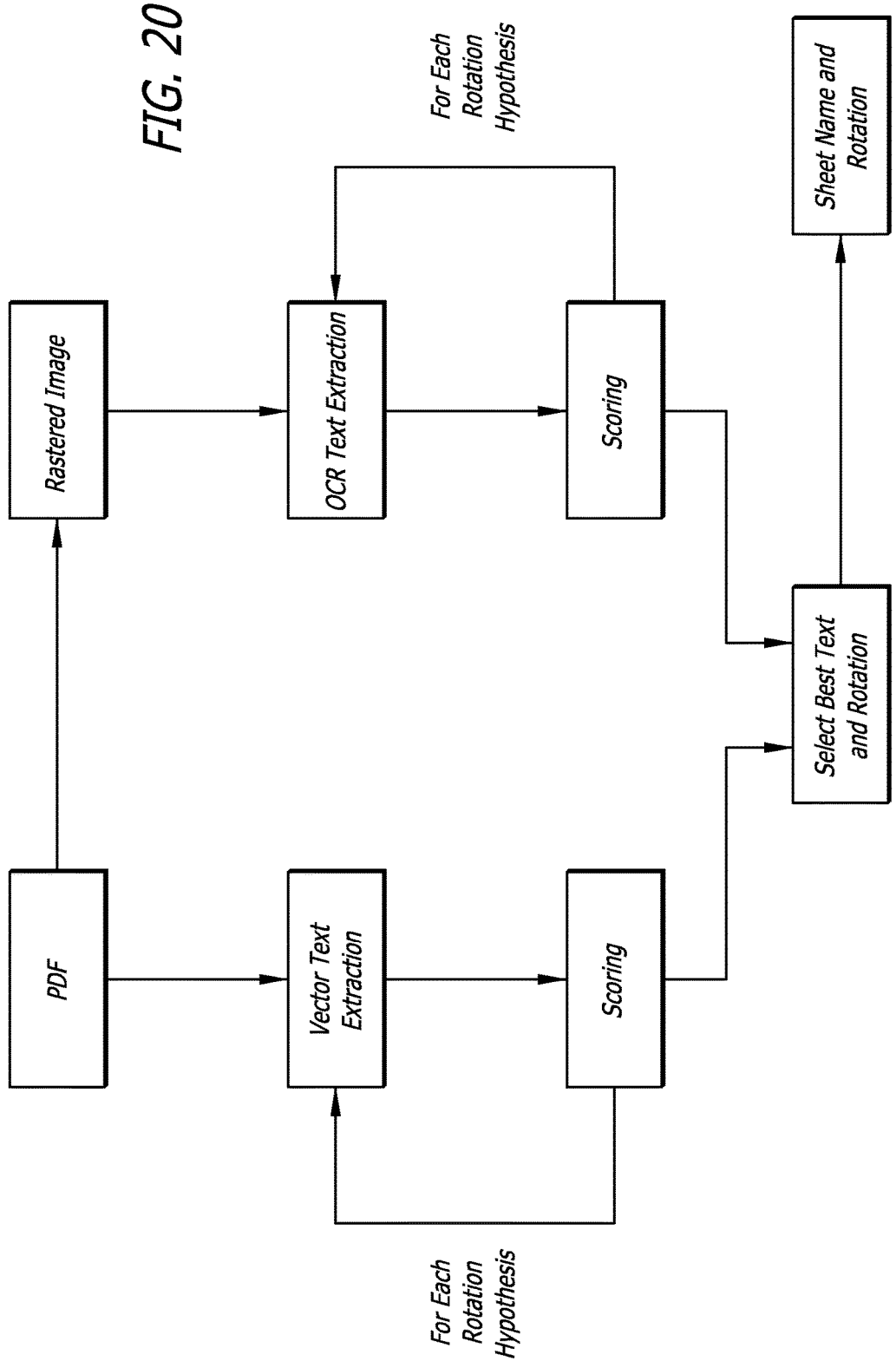
FIG. 20 depicts a flowchart of an algorithm for a rotation hypothesis.
Figure 21:
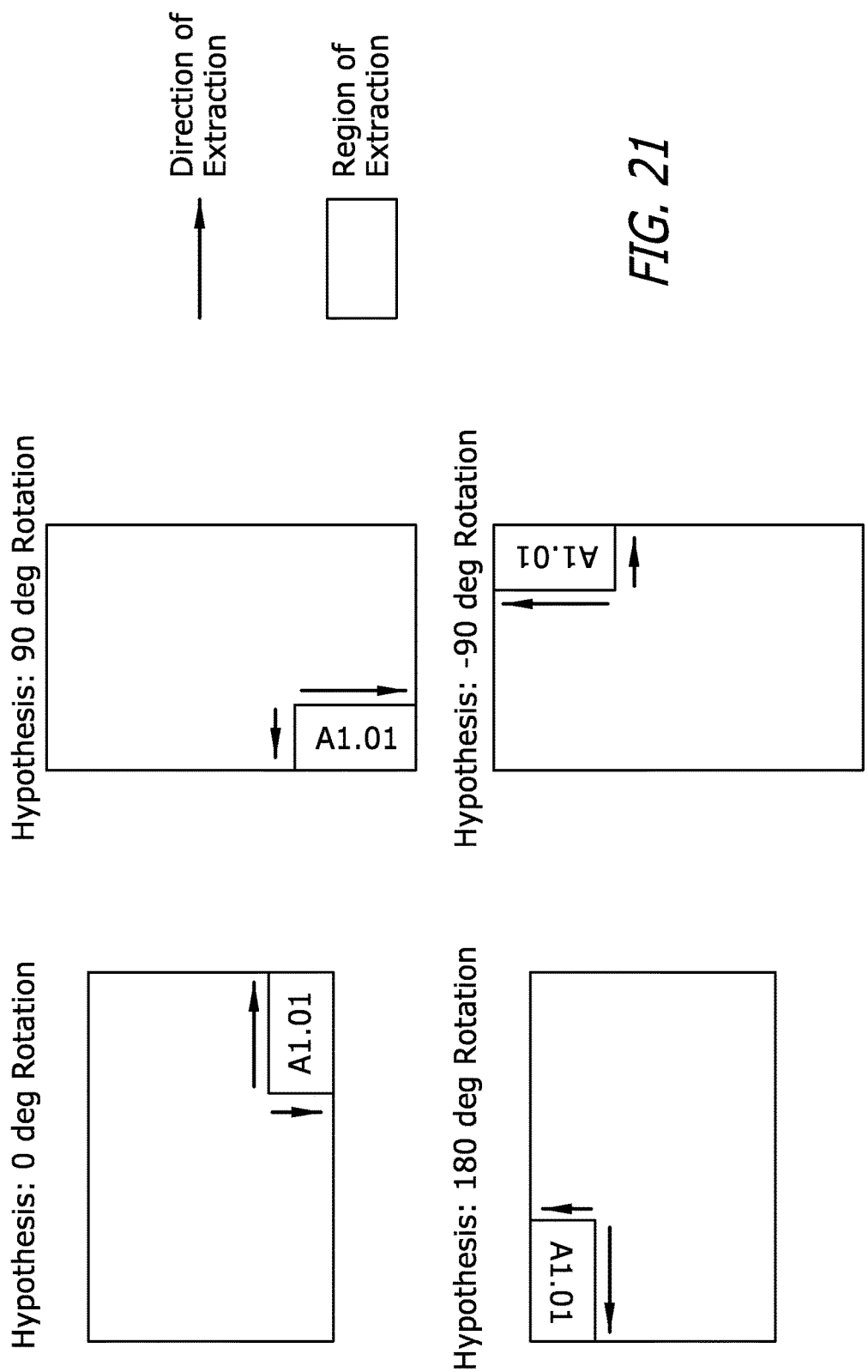
FIG. 21 depicts examples of rotation hypotheses with the tile block originating in different locations.

Additional information regarding sheet name extraction and automatic rotation according to one embodiment includes the information depicted in FIGS. 20 and 21. In particular, FIG. 20 depicts a flowchart of an algorithm for a rotation hypothesis. FIG. 21 depicts examples of rotation hypotheses with the tile block originating in different locations.

As already disclosed herein, various aspects of the electronic blueprint system 100 and methods, function, and steps corresponding thereto may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a hardware processor. A computer system according to any embodiment disclosed herein is configured to perform any of the described functions related to the various embodiments of the electronic blueprint system 100.

As disclosed herein, modules may include software instructions that when executed by a computing device, causes a desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the electronic blueprint system 100 may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such as function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the electronic blueprint system 100 and methods are not limited to being executed on any particular computer system or group of computer systems.

Some methods, functions, steps, or features have been described as being executed by corresponding software by a processor. It is understood than any methods, functions, steps, features, or anything related to the electronic blueprint system 100 may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the electronic blue print system 100. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the electronic blueprint system 100 may be represented by data that may be stored on one or more memories, processed by one or more computing devices, received by one or more computing devices, transmitted by one or more computing devices, and the like.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

What is claimed:

1. A method, comprising:
   receiving, by at least one computing device, a blueprint file that includes data representative of a blueprint having one or more pages including current annotations made by a plurality of users;
   processing, by the at least one computing device, the blueprint file, wherein the processing includes:
      determining the number of pages of the blueprint file,
      determining whether at least one of the pages of the blueprint file has an existing version,
      identifying a previous annotation on the existing version of at least one page of the blueprint file and copying the previous annotation on the existing version to a newer version of the blueprint file,
      revising the newer version of the blueprint file based on the current annotations made by the plurality of users, and
      resolving any conflicts between the newer version of the blueprint file and the existing version of the blueprint file;
   verifying that each page of the newer version of the blueprint file is the newest version;
   distributing, by the at least one computing device, the newer version of the blueprint file to remote computing devices of users on a team working with the blueprint file;
   and
   notifying the remote computing devices of users on the team working with the blueprint file that the distributed pages of the newer version of the blueprint file are the newest version by sending a notification stream by the at least one computing device that is displayed on the remote computing devices of the users.

2. The method of claim 1, further comprising:
   querying, by the at least one computing device, processing modules to determine their availability, wherein each processing module causes, in response to execution by the at least one computing device, further processing of each page; and
   distributing, by the at least one computing device, each page of the blueprint file to available processing modules based on the availability of the processing modules for the further processing of each page such that each page is distributed to a single processing module.

3. The method as set forth in claim 2, wherein the available processing modules are spread over a network of a plurality of computing devices connected over at least one communication network, and wherein the plurality of computing devices includes the at least one computing device.

4. The method as set forth in claim 2, wherein the further processing of each page includes optical character recognition of at least a portion of each page of the blueprint file.

5. The method as set forth in claim 2, wherein the further processing of each page includes extracting metadata associated with each page of the blueprint file.

6. A system, comprising:
   one or more memories in communication with one or more hardware processors of one or more computing devices, wherein the one or more memories have instructions stored thereon that, in response to execution by the one or more computing devices, cause the one or more computing devices to perform operations, comprising:
      receiving a blueprint file that includes data representative of a blueprint having one or more pages including current annotations made by a plurality of users;
      processing the blueprint file, wherein the processing includes:
         determining the number of pages of the blueprint file,
         determining whether at least one of the pages of the blueprint file has an existing version,
         identifying, by the at feast one computing device, previous annotation on the existing version of at least one page of the blueprint file and copying the previous annotation on the existing version to a newer version of the blueprint file;
         revising the newer version of the blueprint file based on the current annotations made by the plurality of users, and
         resolving any conflicts between the newer version of the blueprint file and the existing version of the blueprint file;
      verifying that each page of the newer version of the blueprint file is the newest version;
      distributing a newer version of each page of the newer version of the blueprint file to a remote computing device;
      and
      notifying users on a team working with the blueprint file that the distributed pages of the newer version of the blueprint file are the newest version by sending a notification stream that is displayed on the remote computing devices of the users.

7. The system as set forth in claim 6, wherein the one or more memories have instructions stored thereon that, in response to execution by the one or more computing devices, cause the one or more computing devices to perform operations including:
   querying processing modules to determine their availability, wherein each processing module causes, in response to execution by the at least one computing device, further processing of each page; and
   distributing each page of the blueprint file to available processing modules based on the availability of the processing modules for the further processing of each page such that each page is distributed to a single processing module.

8. The system as set forth in claim 7, wherein the further processing of each page includes tiling each page of the blueprint file.

9. The system as set forth in claim 7, wherein the further processing of each page includes optical character recognition of at least a portion of each page of the blueprint file.

10. The system as set forth in claim 7, wherein the further processing of each page includes extracting a unique identifier associated with each page of the blueprint file.

* * * * *